United States Patent
Selvaraj et al.

(10) Patent No.: US 10,524,012 B2
(45) Date of Patent: Dec. 31, 2019

(54) METHOD AND SYSTEM FOR INTEGRATING CONTENT VIEWING AND COMMUNICATION IN IMMERSIVE SOCIAL CENTRE SESSION

(71) Applicant: Samsung Electronics Co., Ltd., Suwon-si, Gyeonggi-do (KR)

(72) Inventors: Ashok Kumar Selvaraj, Pondicherry (IN); Basavaraj Jayawant Pattan, Bangalore (IN); Kyung-Tak Lee, Yongin-si (KR); Gyubong Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 15/023,224

(22) PCT Filed: Sep. 17, 2014

(86) PCT No.: PCT/KR2014/008664
§ 371 (c)(1),
(2) Date: Mar. 18, 2016

(87) PCT Pub. No.: WO2015/041469
PCT Pub. Date: Mar. 26, 2015

(65) Prior Publication Data
US 2016/0234558 A1 Aug. 11, 2016

(30) Foreign Application Priority Data

Sep. 18, 2013 (IN) .......................... 4201/CHE/2013
Sep. 19, 2013 (IN) .......................... 4223/CHE/2013
Jul. 11, 2014 (IN) .......................... 4201/CHE/2013

(51) Int. Cl.
*G06F 15/16* (2006.01)
*H04N 21/4788* (2011.01)
(Continued)

(52) U.S. Cl.
CPC ......... *H04N 21/4788* (2013.01); *G06Q 50/01* (2013.01); *H04L 12/1818* (2013.01);
(Continued)

(58) Field of Classification Search
CPC ..... G06Q 50/01; H04L 12/1818; H04L 51/32; H04L 65/1006; H04L 65/1016;
(Continued)

(56) References Cited

U.S. PATENT DOCUMENTS 7,562,397 B1 * 7/2009 Mithal ............... G06Q 30/0235
705/52
2004/0071099 A1   4/2004 Costa-Requena et al.
(Continued)

FOREIGN PATENT DOCUMENTS

CN       1703690 A      11/2005
WO    2013/085342 A1     6/2013
WO    2013/089430 A1     6/2013

OTHER PUBLICATIONS

WO 2013/089423 A1; Jayawant Pattan, System, Apparatus and method for utilizing a multimedia service, Jun. 20, 2013.*
(Continued)

*Primary Examiner* — Thuong Nguyen
(74) *Attorney, Agent, or Firm* — Jefferson IP Law, LLP

(57) ABSTRACT

A method and system for establishing the ISC session among one or more communication devices for a content viewing and/or a communication to enable integration of the content viewing and the communication is provided. The integration or convergence of the content viewing and the communication provides an immersive user experience to one or more ISC users in the ISC environment participating in the ISC session including a self ISC session, a one to one ISC session or a group ISC session. The method allows an initiator ISC client to append one or more first parameters in
(Continued)

a first SIP INVITE for the content viewing and one or more second parameters in a second SIP INVITE for the communication. The common appended parameters such as an ISCConvergenceID indicate the media function and the communication function to integrate the communication with respect to the content viewing.

20 Claims, 24 Drawing Sheets

(51) Int. Cl.
| | |
|---|---|
| *H04N 21/63* | (2011.01) |
| *G06Q 50/00* | (2012.01) |
| *H04N 21/254* | (2011.01) |
| *H04N 21/414* | (2011.01) |
| *H04N 21/438* | (2011.01) |
| *H04N 21/61* | (2011.01) |
| *H04N 21/643* | (2011.01) |
| *H04L 12/18* | (2006.01) |
| *H04L 29/06* | (2006.01) |
| *H04N 21/242* | (2011.01) |
| *H04N 21/2668* | (2011.01) |
| *H04N 21/43* | (2011.01) |
| *H04N 21/472* | (2011.01) |
| *H04N 21/6543* | (2011.01) |
| *H04L 12/58* | (2006.01) |

(52) U.S. Cl.
CPC .......... *H04L 51/32* (2013.01); *H04L 65/1006* (2013.01); *H04L 65/1016* (2013.01); *H04L 65/1069* (2013.01); *H04L 65/608* (2013.01); *H04L 65/80* (2013.01); *H04N 21/242* (2013.01); *H04N 21/254* (2013.01); *H04N 21/2668* (2013.01); *H04N 21/41407* (2013.01); *H04N 21/4307* (2013.01); *H04N 21/438* (2013.01); *H04N 21/47214* (2013.01); *H04N 21/6131* (2013.01); *H04N 21/632* (2013.01); *H04N 21/643* (2013.01); *H04N 21/6543* (2013.01)

(58) Field of Classification Search
CPC ... H04L 65/1069; H04L 65/608; H04L 65/80; H04N 21/242; H04N 21/254; H04N 21/2668; H04N 21/41407; H04N 21/4307; H04N 21/438; H04N 21/47214; H04N 21/6131; H04N 21/632; H04N 21/643; H04N 21/6543
USPC .......... 709/227, 228, 203; 370/395.52, 352; 455/414.1, 569.2
See application file for complete search history.

(56) References Cited

U.S. PATENT DOCUMENTS

| | | | |
|---|---|---|---|
| 2006/0056419 A1* | 3/2006 | Eichler | ................... H04L 12/66 370/395.52 |
| 2006/0230154 A1* | 10/2006 | Nguyenphu | ...... H04L 29/06027 709/227 |
| 2008/0117893 A1 | 5/2008 | Witzel et al. | |
| 2008/0168154 A1 | 7/2008 | Skyrm et al. | |
| 2009/0164247 A1* | 6/2009 | Dobler | .................. G06F 19/321 705/3 |
| 2010/0064045 A1* | 3/2010 | Jalkanen | ............. H04L 41/5022 709/227 |
| 2010/0210315 A1* | 8/2010 | Miyake | ................... H04L 51/24 455/569.2 |
| 2011/0206010 A1 | 8/2011 | Keller et al. | |
| 2014/0269681 A1* | 9/2014 | Singh | .................. H04L 65/1069 370/352 |

OTHER PUBLICATIONS

Open Mobile Alliance Ltd., Immersive Social Centre Requirements, Candidate Version 1.0, Apr. 2, 2013, pp. 1-29, http://technical.openmobilealliance.org/Technical/technical-information/release-program/current-releases/isc-archives.

Perez et al., Network convergence and QoS for future multimedia services in the VISION project, Computer Networks, Mar. 16, 2012, vol. 56, Issue 4, pp. 1183-1199, http://www.sciencedirect.com/science/article/pii/S1389128611004154#.

Handley M et al., "RFC 2543 SIP: Session Initiation Protocol", Network Working Group Request for Comments, Mar. 1, 1999, pp. 1-153, XP000864299.

Handley M et al., "RFC 2327 SDP: Session Description Protocol", Network Working Group Request for Comments, Apr. 1, 1998, pp. 1-42, XP002279253.

\* cited by examiner

METHOD AND SYSTEM FOR INTEGRATING CONTENT VIEWING AND COMMUNICATION IN IMMERSIVE SOCIAL CENTRE SESSION

CROSS REFERENCE TO RELATED APPLICATION(S)

This application is a U.S. National Stage application under 35 U.S.C. § 371 of an International application filed on Sep. 17, 2014, and assigned application number PCT/KR2014/008664, which claimed the benefit of an Indian patent application filed on Sep. 18, 2013, in the Indian Patent Office and assigned Serial number 4201/CHE/2013, an Indian patent application filed on Sep. 19, 2013, in the Indian Patent Office and assigned Serial number 4223/CHE/2013, and an Indian patent application filed on Jul. 11, 2014, in the Indian Patent Office and assigned Serial number 4201/CHE/2013, the entire disclosures of which are hereby incorporated by reference.

TECHNICAL FIELD

The present invention relates to mobile communications and more particularly relates to enabling multimedia service on mobile devices by integrating content viewing and communication.

BACKGROUND ART

Rapid developments in mobile communication technology provide ubiquitous network connectivity. With evolving communication devices such as smart phones; demand for content viewing on the communication devices is growing exponentially. In today's highly competitive telecommunication industry, providing rich and satisfying user experience is a challenging task for network operators and service providers. Thus, service providers are keen on focusing their efforts towards providing value added services with the content viewing service provided to a user on his/her mobile communication device. Convergence of content viewing and communication enables the service provider to provide an immersive experience to the user. For example, chatting with a group of friends while the group enjoys watching same match live on their respective smart phones.

Existing methods provide standard and non-standard enablers for distribution of multimedia for content viewing and communication. However, content viewing and communication are mostly deployed as silos and are mostly based on interfaces independent of each other. This independent deployment is a hurdle for providing integration of content viewing and communication. Currently, whenever the user desires to communicate with other users in context of the content being viewed on his/her mobile communication device; generally, the user explicitly provides the context of the content being viewed. This fails to provide an immersive feeling in context of the content being viewed simultaneously by multiple users on their respective communication devices.

However, the service provider delivering the content to the user is aware of the user context with reference to content being viewed by the user. Currently, Open Mobile Alliance (OMA) has identified requirements of the Immersive Social Centre (ISC) enabler to include requirements for enhancing user experience with value added features to provide immersive (being their-being with) experience. These value added features include enabling multiple communication devices identified as a group to simultaneously organize a content viewing session and a communication session to enable integration of content viewing and communication session in the group with reference to the content being viewed.

Providing efficient methods to meet the requirements of the ISC enabler for integration of content viewing and communication to enhance user experience and effectively improve service penetrations will be appreciated.

DISCLOSURE OF INVENTION

Technical Problem

However, the service provider delivering the content to the user is aware of the user context with reference to content being viewed by the user. Currently, Open Mobile Alliance (OMA) has identified requirements of the Immersive Social Centre (ISC) enabler to include requirements for enhancing user experience with value added features to provide immersive (being their-being with) experience. These value added features include enabling multiple communication devices identified as a group to simultaneously organize a content viewing session and a communication session to enable integration of content viewing and communication session in the group with reference to the content being viewed.

Solution to Problem

The principal object of the embodiments herein is to provide a method and system to establish an Immersive Social Centre (ISC) session for content viewing and/or communication based on ISC architecture for a personal ISC session, a one to one ISC session or a group ISC session.

Another object of the invention is to provide a method that enables integration of content viewing and/or communication in the established ISC session.

Accordingly the invention provides a method for establishing an Immersive Social Centre (ISC) session by an ISC server, wherein the method comprises receiving a first Session Initiation Protocol (SIP) INVITE including at least one first parameter from an initiator ISC client by a media function in the ISC server. The first SIP INVITE is for initiating the ISC session for a content viewing when the initiator ISC client receives a request for establishing the ISC session for the content viewing, wherein the at least one first parameter comprises a header field, at least one element in a Multipurpose Internet Mail Extensions (MIME) body and a Session Description Protocol (SDP). Further the initiated ISC session for the content viewing is identified by an ISC session identifier sent in the header field of the at least one first parameter. The method further comprises receiving a second SIP INVITE comprising at least one second parameter from the initiator ISC client by a communication function in the ISC server. The second SIP INVITE is for initiating the ISC session for a communication when the initiator ISC client receives the request for establishing the ISC session for the communication. Further, a communication session identifier in the second SIP INVITE is assigned with a value of the ISC Convergence ID for integrating the communication with the content viewing in the ISC session and the at least one second parameter comprises the header field, the at least one element in the MIME body and the SDP. Furthermore, the method comprises establishing the ISC session for the content viewing by the media function based on the ISC session identifier received in the first SIP invite, the element in the MIME body and the SDP in the first SIP INVITE. Furthermore, the method comprises establishing the ISC session for the communication by the communication function based on the communication session identifier received in the second SIP invite assigned with the value of the ISC session identifier, the SDP and the element in the MIME body of the second SIP INVITE. The communication session identifier identifies the communication in the ISC session.

Accordingly the invention provides a method for initiating an Immersive Social Centre (ISC) session by an initiator ISC client, wherein the method comprises receiving a request to initiate the ISC session for at least one of content viewing and communication. Further, the method comprises generating and sending a first Session Initiation Protocol (SIP) INVITE including at least one first parameter to a media function in the ISC server for initiating the ISC session for the content viewing when the received request is for the content viewing. Further, the at least one first parameter comprises an header field, at least one element in a Multipurpose Internet Mail Extensions (MIME) body and a Session Description Protocol (SDP) and the initiated ISC session for the content viewing is identified by an ISC session identifier sent in the header field of the at least one first parameter. Further, the method comprises generating and sending a second SIP INVITE comprising at least one second parameter to a communication function in the ISC server to initiate the ISC session for the communication when the received request is for the communication. Further, a communication session identifier in the second SIP INVITE is assigned with a value of the ISC session identifier for integrating the communication with the content viewing and the at least one second parameter comprises the header field, the at least one element in the MIME body and the SDP. Further, the method comprises participating in the ISC session for content viewing after the media function establishes the ISC session based on the ISC session identifier, the element in the MIME body and the SDP in the first SIP INVITE. Furthermore, the method comprises participating in the ISC session for communication after the communication function establishes the ISC session for the communication based on the communication session identifier assigned with the value of the ISC session identifier, the SDP and the element in the MIME body of the second SIP INVITE.

Accordingly the invention provides a method for participating in an Immersive Social Centre (ISC) session by an recipient ISC client, wherein the method comprises receiving at least one of a forwarded first SIP INVITE from a media function of a ISC server and a forwarded second SIP invite from a communication function of the ISC server for participating in an ISC session initiated by an initiator ISC client. Further the ISC session is one of a one to one ISC session and a group ISC session initiated by an initiator ISC client. Further, the method comprises determining whether the ISC session is for at least one of the content viewing and the communication based on a value of a ISC SessionType received in at least one of a forwarded first SIP INVITE from the media function of a ISC server and a forwarded second SIP INVITE received from the communication function of the ISC server. Further, the method comprises notifying an ISC user of the recipient ISC client of invitation for the initiated ISC session based on the determined value of the ISC SessionType. Furthermore, the method comprises sending response to the media function and the communication function indicating participation in the ISC session based on input from the ISC user.

Accordingly the invention provides a system for establishing an Immersive Social Centre (ISC) session, wherein the system comprises an ISC server, an initiator ISC client, and plurality of recipient ISC clients. Further the initiator ISC client configured to receive a request to initiate the ISC session for at least one of content viewing and communication. Further, the initiator ISC client is configured generate and send a first Session Initiation Protocol (SIP) INVITE including at least one first parameter to a media function in the ISC server for initiating the ISC session for the content viewing when the received request is for the content viewing. Further, the at least one first parameter comprises an header field, at least one element in a Multipurpose Internet Mail Extensions (MIME) body and a Session Description Protocol (SDP) and wherein the initiated ISC session for the content viewing is identified by an ISC session identifier sent in the header field of the at least one first parameter. Further the initiator ISC client is configured to generate and send a second SIP INVITE comprising at least one second parameter to a communication function in the ISC server to initiate the ISC session for the communication when the received request is for the communication. Further, a communication session identifier in the second SIP INVITE is assigned with a value of the ISC session identifier for integrating the communication with the content viewing and the at least one second parameter comprises the header field, the at least one element in the MIME body and the SDP. Further the media function is configured to receive the first SIP INVITE sent by the initiator ISC client and establish the ISC session for the content viewing based on received the ISC session identifier, the element in the MIME body and the SDP in the first SIP INVITE. Further, the communication function is configured to receive the second SIP INVITE sent by the initiator ISC client and establish the ISC session for the communication based on received communication session identifier assigned with the value of the ISC session identifier, the SDP and the element in the MIME body of the second SIP INVITE.

Accordingly, the invention provides a computer program product comprising computer executable program code recorded on a computer readable non-transitory storage medium, the computer executable program code when executed, causing the actions including receiving a first Session Initiation Protocol (SIP) INVITE including at least one first parameter from an initiator ISC client by a media function in the ISC server for initiating the ISC session for a content viewing when the initiator ISC client receives a request for establishing the ISC session for the content viewing. The at least one first parameter comprises a header field, at least one element in a Multipurpose Internet Mail Extensions (MIME) body and a Session Description Protocol (SDP). The initiated ISC session for the content viewing is identified by an ISC session identifier sent in the header field of the at least one first parameter. Further the computer program product is configured to receive a second SIP INVITE comprising at least one second parameter from the initiator ISC client by a communication function in the ISC server to initiate the ISC session for a communication when the initiator ISC client receives the request for establishing the ISC session for the communication and a communication session identifier in the second SIP INVITE is assigned with a value of the ISC session identifier for integrating the communication with the content viewing in the ISC session. The at least one second parameter comprises the header field, the at least one element in the MIME body and the SDP. Further, the computer program product is configured to establish the ISC session for the content viewing by the media function based on the ISC session identifier received in the first SIP invite, the element in the MIME body and the SDP in the first SIP INVITE. Furthermore, the computer program product is configured to establish the ISC session for the communication by the communication function based on the communication session identifier received in the second SIP invite assigned with the value of the ISC session identifier. Further, the ISC session is established based on the SDP and the element in the MIME body of the second SIP INVITE, wherein the communication session identifier identifies the communication.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1:
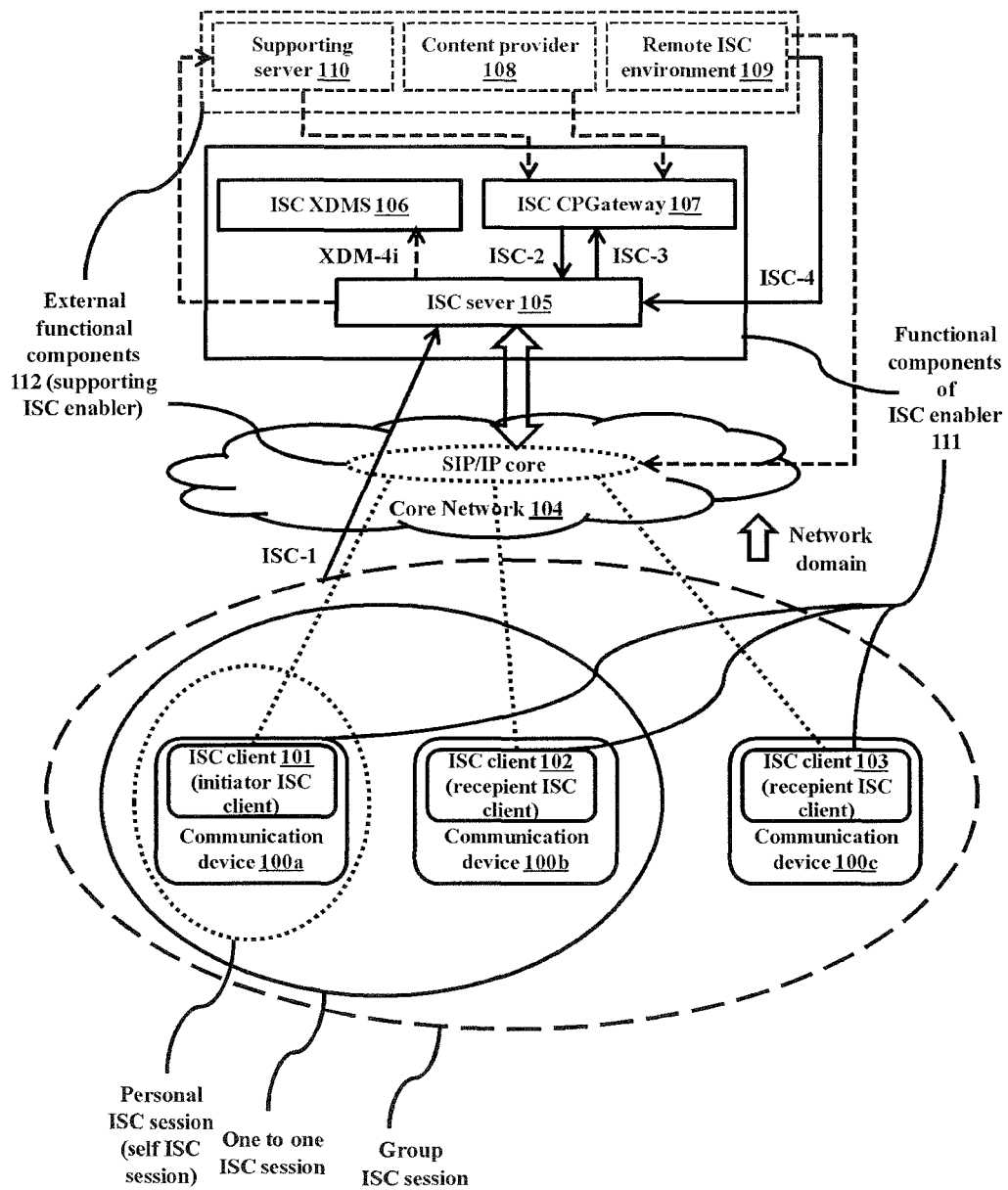
FIG. 1 illustrates an Immersive Social Centre (ISC) architecture for establishing an ISC session, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Prior to describing the embodiments in detail, it is useful to provide definitions for key terms and concepts used herein. Unless defined otherwise, all technical and scientific terms used herein have the same meaning as commonly understood by a person having ordinary skill in the art to which this invention belongs.

Initiator Immersive Social Centre (ISC) client: Refers to an ISC client on a communication device that initiates an ISC session. The ISC session is initiated by an initiator ISC client on receiving a request from a user (ISC user) and receiving ISC service from an ISC enabler provided by an ISC environment. The ISC session can be a personal ISC session, a one to one ISC session or a group ISC session. Further, the initiator ISC client is also called the originating client.

Recipient ISC client: Refers to an ISC client on another communication device of another ISC user participating in the ISC session. The ISC session referred here can be one to one ISC session or a group ISC session initiated by the initiator IS client. Here, group ISC session may involve a session established among multiple ISC clients forming the group. Further, the recipient ISC client is also called the terminating client.

The embodiments herein achieve a method and system for establishing the ISC session among one or more communication devices for content viewing and/or a communication to enable integration of the content viewing and the communication in an ISC environment. The integration or convergence of the content viewing and the communication provides an immersive user experience to the ISC users in the ISC environment participating in the ISC session.

The ISC session can be a personal ISC session, a one to one ISC session or the group ISC session managed by an ISC server in the ISC enabler. A personal ISC session also called a self ISC session is initiated by an initiator ISC client for content viewing. A one to one ISC session is a session between the initiator ISC client and a recipient ISC client selected from a plurality of recipient ISC clients in the ISC environment. A group ISC session is among group members including the initiator ISC client and plurality of recipient ISC clients in the ISC environment.

The method allows a media function in the ISC server to manage the content viewing of ISC session and allows a communication function of the ISC server to manage the communication of the ISC session using Session Initiation Protocol (SIP). The method allows the initiator ISC client to append one or more first parameters in a first SIP INVITE for the content viewing and one or more second parameters in a second SIP INVITE for the communication.

In an embodiment, the initiator ISC client internally communicates with an initiator communication client (Converge IP Messaging (CPM) client) to generate and send the second SIP INVITE for communication towards communication function. The appended parameters such as an ISC session identifier which is an ISC Convergence ID common to both the first SIP INVITE and the second SIP INVITE indicate the media function and the communication function to establish the communication with respect to the content viewing.

The first SIP INVITE and the second SIP INVITE are forwarded to one or more recipient ISC clients based on whether the ISC session request is for the one to one ISC session or the group ISC session. The appended parameter such as an ISC SessionType (SessionType) to the first SIP INVITE and second SIP INVITE indicate the recipient ISC clients whether the request received for ISC session establishment is for either or both the content viewing and the communication.

In an embodiment, the recipient ISC client internally communicates with a recipient CPM client for handling the second SIP INVITE, forwarded by the communication function. The integration provided by the method enables the communication function to establish the communication with reference to the content being viewed during the content viewing established by the media function.

Further, the method allows the ISC server to manage the request received from the initiator ISC client for initiation of the ISC group session among a pre-defined ISC group or an ad-hoc ISC group formed by the initiator ISC client.

In an embodiment, the method allows the ISC server to manage the request from the initiator ISC client for change of content being viewed during the established ISC session. The method allows the ISC server to manage request from recipients ISC client participating in an established ISC session to leave the established ISC session.

In an embodiment, the method allows the initiator ISC client to send a request for adding or terminating the group members to or from an established group ISC session. Furthermore, the method allows the initiator ISC client to send a request for extending an established one to one ISC session to the group ISC session.

However, the communication function refers to the CPM enabler server-side functional component, thus throughout the description the terms communication function and CPM are used interchangeably.

In an embodiment the communication device can be a smart phone, a tablet, a personal digital assistant, a palmtop, a laptop and any other communication device capable handling ISC session.

Referring now to the drawings that include FIGS. 1 through 22, where similar reference characters denote corresponding features consistently throughout the figures, there are shown preferred embodiments.

FIG. 1 illustrates ISC architecture for establishing the ISC session, according to embodiments as disclosed herein. The figure depicts the ISC environment with plurality of components of the ISC architecture.

As per the standard specification provided by the OMA alliance, the ISC architecture includes an ISC enabler 111 including plurality of functional components and supported by external functional components 112. In the communication device, the ISC enabler 111 includes an ISC client 101 (initiator ISC client), an ISC client 102 (recipient ISC client) and an ISC client 103 (recipient ISC client) associated with a communication device 100*a*, 100*b* and 100*c* respectively. In the network domain, the ISC enabler 111 includes an ISC server 105, an ISC XML Document Management Server (ISC XDMS) 106 and an ISCCP Gateway (CP Gateway) 107. The ISC enabler functional components in a network domain are supported by external functional components 112 including but not limited to SIP/IP core of the core network 104, a content provider 108, a remote ISC environment 109 and a supporting server 110.

The method disclosed allows the initiator ISC client 101 to initiate the ISC session for content viewing and/or communication among ISC users of communication devices 100*b* and 100*c* respectively in the ISC environment depicted by the FIG. 1. The ISC session initiation request is communicated to the ISC server 105 of the ISC enabler through the SIP/IP core of the core network 104 that provides SIP/IP-based functionalities required by the ISC enabler.

As a person skilled in the art understands that the initiator ISC client 101 can have access to contents list for specifying the content to be viewed during the content viewing.

In an embodiment the initiator ISC client 101 can retrieve the contents list after performing the procedures specified in filed PS application 4142/CHE/2013 for retrieving the contents list. The content list format can be as specified in the PS application 4142/CHE/2013.

However, the media function in the ISC server 105 generates a request towards ISC CPGateway 107 if the requested content packets are already not available with the media function. Further, the ISC CPGateway 107 can request the content provider 108 to provide the required content packets to be delivered to the ISC clients participating in the session.

In an embodiment, the content received by the media function of the ISC server 105 from the ISC CPGateway 107 is unicast or multicast packets.

The ISC session is initiated by the initiator ISC client 101 on reception of ISC session establishment request from the ISC user of the communication device 100*a*. Based on the type of request from the ISC user, the ISC session initiated by the initiator ISC client 101 can be the personal ISC session only for the content viewing. The initiated ISC session can also be the one to one ISC session between ISC users of communication devices 100*a* and 100*b* respectively for the content viewing and/or the communication. The initiated ISC session can also be the group ISC session between ISC users of communication devices 100*a*, 100*b* and 100*c* respectively for the content viewing and/or the communication. The method allows the initiator ISC client 101 to send the first SIP INVITE for the content viewing to the ISC server 105 by appending one or more first parameters. The method allows the initiator ISC client 101 to send the second SIP INVITE for the communication by appending one or more second parameters.

The exchange of control signals and messages between the initiator ISC client 101 and one or more recipient ISC clients 102 and 103 respectively is managed by the media function and the communication function of the ISC server to establish ISC session as received in the first SIP INVITE and second SIP invite. However, control signals and messages are exchanged among other functional components within the ISC server 105 and external functional components 112 of the ISC enabler such as the supporting server 110 and the remote ISC environment 109 which resides in other network environment.

The ISCConvergenceID appended to both the first SIP INVITE and the second SIP INVITE enables the media function and the communication function to identify interrelation between initiated content viewing and communication. Thus, the ISCConvergenceID integrates the content viewing and the communication if the ISC user requests the ISC session for both the content viewing and the communication.

The session type appended to both the first SIP INVITE and the second SIP INVITE indicates one or more recipient ISC clients whether the received first SIP INVITE and the second SIP INVITE are for only content viewing, only communication or both the content viewing and the communication.

On establishment of the requested ISC session, the media function delivers the requested content to one or more participants in the ISC session.

The content available to one or more participants of the ISC session (for example, ISC users of communication devices 100*a*, 100*b* and 100*c* respectively) can be a unicast or multicast content.

In an embodiment, the content can be media content such as a live content, a video on demand and the like provided by the content provider 108.

In an embodiment, the method allows the ISC clients 101, 102 and 103 respectively and the media function of the ISC server 105 to use any of the unicast or multicast protocols such as User Datagram Protocol (UDP) or Real-time Transport Protocol (RTP) (UDP/RTP), Internet Group Management Protocol (IGMP) and the like for receiving and delivering the contents to be viewed.

The established ISC session for communication can be a chat session, a video call, a voice over IP (VoIP) call and the like based on the choice of communication selected by the ISC user.

In an embodiment, the ISC user can change the content being viewed without tearing down the established ISC session using a SIP re-INVITE message.

In an embodiment, during an ongoing one to one ISC session, if a value of synchronization field Sync in the SIP re-INVITE message is set (yes) indicates the media function that the recipient ISC client has to be synchronized for content viewing. Thus, changes on content being viewed are reflected while delivery of content to the recipient ISC client.

However, for the group ISC session, the synchronization field Sync can be set (yes) as a default setting, thus synchronizing the content viewed by all the participants (group members) of the ISC group session.

In an embodiment, the method enables one or more ISC clients to provide one or more ISC users with RTSP controls with respect to the content being viewed in the personal ISC session, the one to one ISC session or the group ISC session.

The communication devices 100*a*, 100*b* and 100*c* respectively are illustrated for simplicity of understanding. However, the ISC environment can include a plurality of communication devices capable of participating in the ISC session on receiving a request from any initiator ISC client in the ISC environment.

Figure 2:
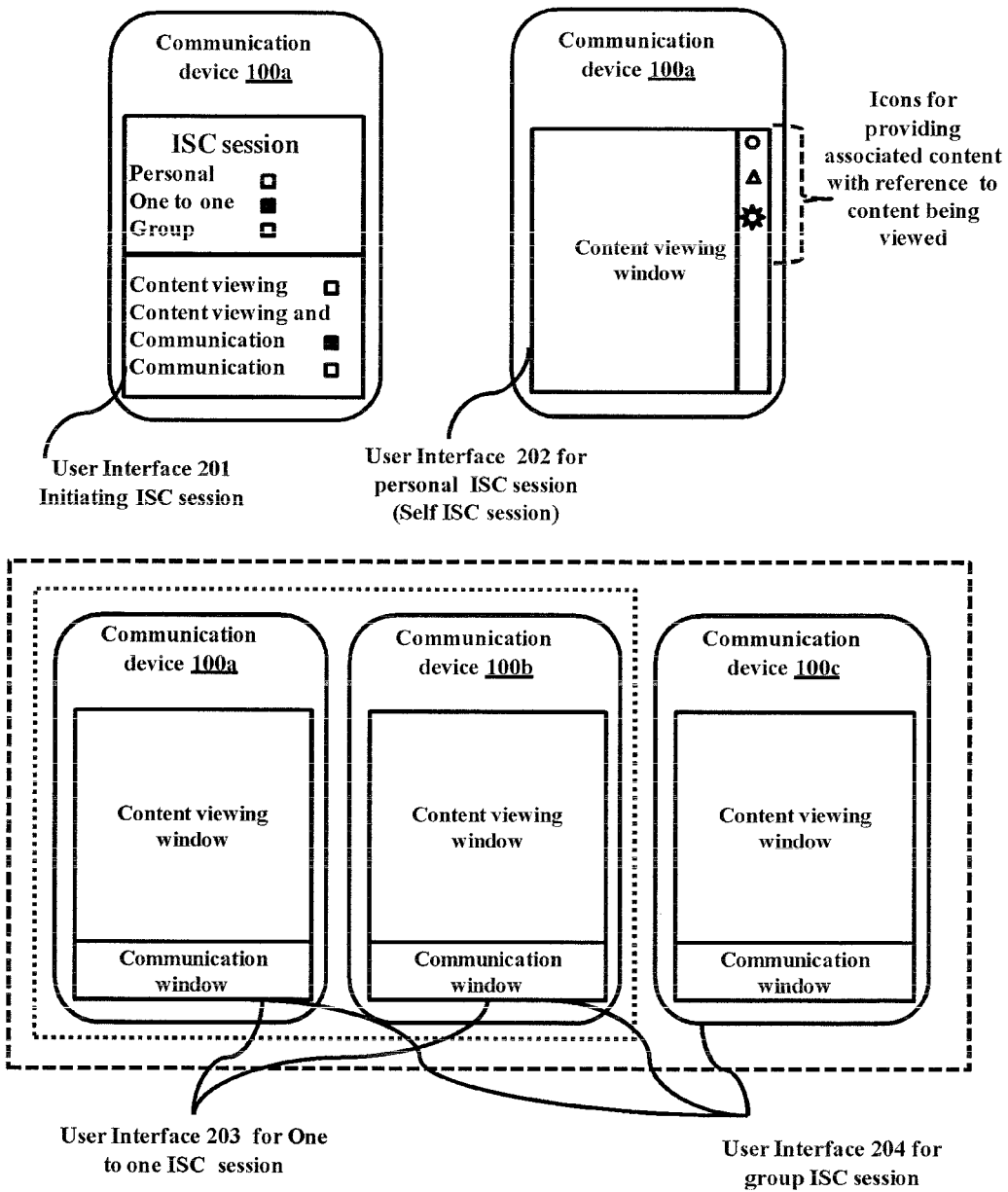
FIG. 2 is an example illustration of User Interface on communication devices participating in the ISC session, according to embodiments as disclosed herein.

FIG. 2 is the example illustration of UI on communication devices participating in the ISC session, according to embodiments as disclosed herein. The FIG. 2 depicts UI 201 displayed to the ISC user of the communication device 100*a*. The ISC user can select the desired mode of ISC session. The ISC session can be the personal ISC session, the one to one ISC session or the group ISC session for only content viewing, for only communication or both. If the ISC user selects the personal ISC session the content delivered to the ISC user for example can be as depicted by UI 202. The method enables the media function of the ISC server 105 to deliver the desired contents along with associated content with reference to the content being viewed. The associated contents can be various types of media content such as text, static image, audio or video clips and the like used to provide enhancements or supplementary information to a main content being viewed.

For example, the associated contents provided along with the content delivered can be indicated to the ISC user using icons. The ISC user can click on the icons to retrieve additional information. For example, the ISC user can browse through history of a place while content delivered to the ISC user displays live match being played at the place.

The UI 203 of the communication devices 100*a* and 100*b* respectively engaged in the one to one ISC session for the content viewing and the communication are depicted. For example, the common content being viewed is displayed in a larger window on screens of both the communication devices 100*a* and 100*b* respectively, while a smaller window is opened to allow the chat communication session between the ISC users participating in the session.

The UI 204 of the communication devices 100*a*, 100*b* and 100*c* participating in the group ISC session for the content viewing and having a chat communication are depicted.

However, if the ISC user selects to communicate with one or more ISC users participating in the one to one ISC session or the group ISC session using the video call or the voice call, a corresponding video call window or a voice call icon can be displayed on the communication devices of the participating ISC users.

The UI described is an example interface and not a limitation and can be communication device implementation specific.

Figure 3:
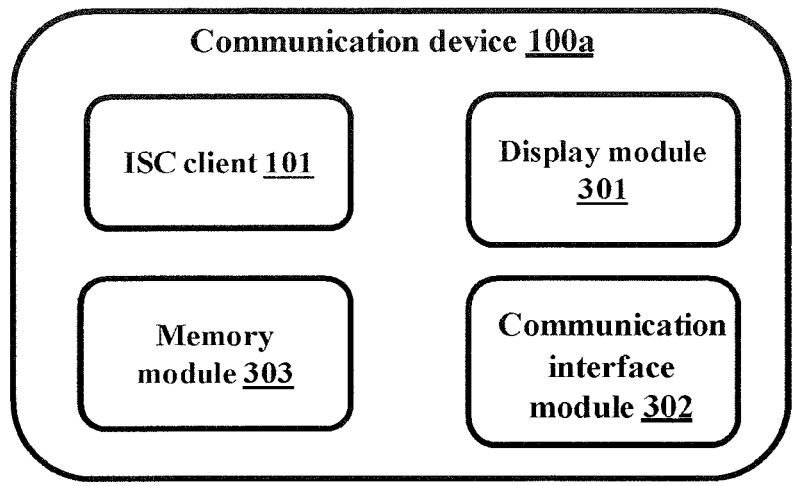
FIG. 3 illustrates modules of a communication device for establishing the ISC session, according to embodiments as disclosed herein.

FIG. 3 illustrates modules of a communication device for establishing the ISC session, according to embodiments as disclosed herein. The communication device 100*a* includes the ISC client 101, a communication interface module 301, a display module 302 and a memory module 303. The ISC client 101 is configured to function as the initiator ISC client when the ISC user request for establishing the ISC session and is configured to function as the recipient ISC client when the ISC client receives the first Session Initiation Protocol (SIP) invite and/or the second SIP INVITE from the ISC server for participating in the initiated ISC session for the content viewing and/or the communication. The ISC client 101 is configured to receive request from the ISC user for establishing the ISC session for the content viewing and/or communication and initiate various SIP based messages and control signals towards the ISC server 105. The ISC client 101 is configured to append one or more first parameters to the first SIP INVITE and/or one or more second parameters to the second SIP INVITE sent to the ISC server for establishing the ISC session. Further, the ISC client 101 is configured to send and receive other control signals and messages for establishing and managing the ISC session including but not limited to sending and receiving various SIP signals to and from the communication function and/or the media function of the ISC server 105. The display module 301 can provide the necessary user interface for the ISC client 101 to receive ISC session establishment request from the user as well as provide indications to the ISC user depicting progress of the initiated ISC session. The communication interface module 302 provides the necessary communication interface to the ISC client 101 to communicate with the ISC server 105.

The ISC client 101 when configured to function as recipient ISC client notifies the ISC user about incoming request to join initiated ISC session and sends control signals and messages to the ISC server 105 based on whether the ISC user desires to join or leave the ISC session.

The memory module 303 stores contact details and group details of other ISC users, to be used by the ISC client 101 during the initiation of the ISC session.

For simplicity and ease of understanding, the modules in communication device 100*a* are limited to the embodiments of the invention. However, the communication device 100*a* includes various other modules to support additional functionalities and operations of the communication device 100*a*.

Although it is illustrated in FIG. 3 that the modules are present in the communication device 100*a*, it has to be understood by a person of ordinary skill in the art to incorporate the same modules in other communication devices such as communication device 100*b* and communication device 100*c*. The names of the modules of the communication device 100*a* are used for illustrative purposes only and should not be considered as a limitation.

Figure 4:
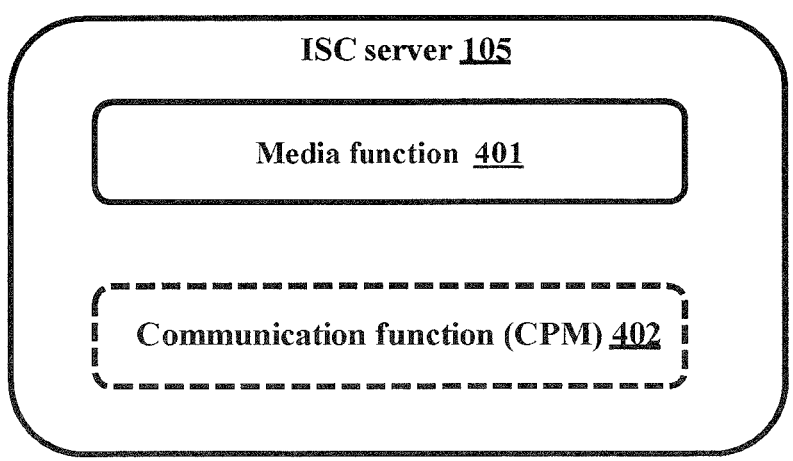
FIG. 4 illustrates modules of an ISC server for establishing the ISC session initiated by the communication device, according to embodiments as disclosed herein.

FIG. 4 illustrates modules of the ISC server for establishing the ISC session initiated by the communication device, according to embodiments as disclosed herein. The ISC server 105 includes a media function 401 and a communication function 402 along with other functional components as defined by the OMA. However for simplicity of understanding the functional components relevant to the method disclosed are illustrated and explained. The other functional components of the ISC server including but not limited to a contents guide function, an associated contents guide function, a multi-device discovery function, a social function, a storage function perform functions to support the media function 401 and the communication function (CPM) 402 as defined in the OMA standard. Also, the functional interaction between the functional components is as defined in the OMA standard and is not explained for simplicity. The media function 401 and the communication function 402 is configured to receive SIP based control signals and messages from one or more of the ISC clients in the ISC environment related with the content viewing and the communication for the initiated ISC session. The media function 401 is configured to receive and forward the first SIP INVITE signal received from the initiator ISC client 101 to the recipient ISC client 102. Whenever the group ISC session is initiated for the pre-defined group, the media function 401 is further configured to obtain the group members of the pre-defined ISC group and pre-defined policy of the pre-defined ISC group participating in the group ISC session from the ISC XDMS 106. The media function 401 is configured to identify the pre-defined group based on an ISC GroupID (GroupID) received in the first SIP invite.

On receiving a first SIP INVITE accept message from one or more recipient ISC clients, the media function 401 is configured to deliver the content to the one or more recipient ISC clients for the content viewing.

The communication function 402 which is the communication function of the ISC Server side functional component directly refers to the CPM Enabler server side functional components to support interaction among the ISC users and between the ISC User and the content provider. The communication function 402 is configured to receive and forward the second SIP INVITE signal received from the initiator ISC client 101 to the recipient ISC client 102.

The names of the modules of the ISC server 105 are used for illustrative purposes only and should not be considered as a limitation.

In an embodiment, the ISC server 105 can be configured to integrate the functionalities of the media function 401 and the communication function 402 in a single functional component.

Figure 5:
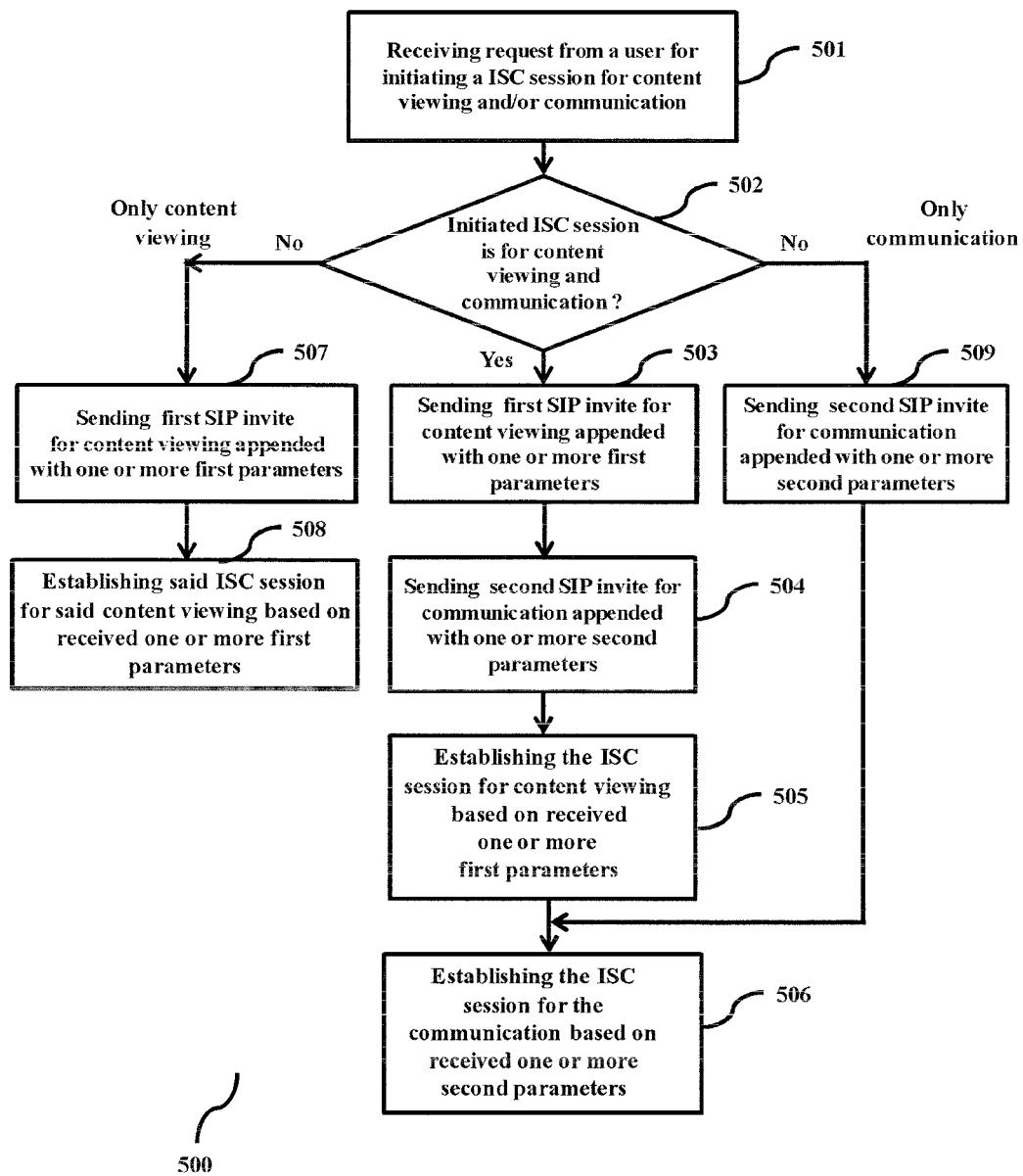
FIG. 5 is a flow diagram illustrating a method for establishing an ISC session for content viewing and/or communication, according to embodiments as disclosed herein.

FIG. 5 is the flow diagram illustrating a method 500 for establishing an ISC session for content viewing and/or communication, according to embodiments as disclosed herein. At step 501, the method 500 includes receiving request from the user (ISC user) for initiating the ISC session for content viewing and/or communication. In an embodiment, the method 500 allows the initiator ISC client 101 to receive request from the ISC user of the communication device 100a for initiating the ISC session for the content viewing and/or the communication. At step 502, the method 500 includes determining whether the initiated ISC session is for the content viewing and the communication.

In an embodiment, the method 500 allows the initiator ISC client 101 to determine whether the initiated ISC session is for the content viewing and the communication. If it is determined at step 502, that the initiated ISC session is for the content viewing and the communication, then at step 503, the method 500 includes sending the first SIP INVITE for content viewing appended with one or more first parameters. In an embodiment, the method 500 allows the initiator ISC client 101 to send the first SIP INVITE for content viewing appended with one or more first parameters.

The initiated ISC session can be the personal ISC session, the one to one ISC session or the group ISC session. Further, once the ISC session is established by and the ISC server based on the request received from the initiator ISC client any participant can be added or removed from either or both the content viewing and the communication in the established ISC session by the ISC server.

In an embodiment, the ISC server allows one or more recipient ISC clients participating in the established ISC session to voluntarily leave the ISC session.

In an embodiment, one or more first parameter includes but is not limited to an ISC feature tag (feature tag), a content ID (ContentRef), the ISCConvergenceID, the ISC SessionType, the ISC GroupID, a Uniform Resource Identifier (URI) list, a synchronization field Sync and a mReal Time Streaming Protocol (mRTSP).

The ISC feature tag in the first SIP INVITE indicates the ISC server 105 whether the initiated ISC session is for establishing the personal ISC session, the one to one ISC session or the group ISC session for content viewing. The ISC Client includes both an IMS Communication Service Identifier (ICSI) and an IMS Application Reference Identifier (IARI) feature tag in the Accept-Contact header, Contact header and P-Preferred-Service header as per [RFC3841], [RFC3840], if the ISC Server has to behave differently when it receives IARI, else the ISC Client includes only ICSI feature tag in the request.

For example CV_FT (Content Viewing Feature Tag) is an ISC feature tag set to: −+g.3gpp.icsi-ref="urn%3Aurn-7%3A3gpp-service.ims.icsi.omalsc.<isc-feature>" when it is carried as a feature tag in a Contact or Accept-Contact header; and, −urn:urn-7:3gpp-service.ims.icsi.oma.isc.<isc-feature> when it is carried as a URN in a P-Preferred-Service or P-Asserted-Service header as described in [3GPP TS 24.229].

The table 1 provided below describes the ISC feature tag.

TABLE 1

| ISC Session requested by ISC user | <isc-feature> (ISC feature tag) | Description |
|---|---|---|
| ISC Content Viewing and Communication Integrated Session | cv-cm = +g.3gpp.icsi-ref="urn%3Aurn-7%3A3gpp-service.ims.icsi.oma.isc.cv-cm | ICSI identifier for content viewing and communication integration session. |
| Personal content Viewing | self-cv = +g.3gpp.icsi-ref="urn%3Aurn-7%3A3gpp-service.ims.iari.oma.isc.self-cv | This IARI identifier is used when ISC user is initiating ISC session for content viewing. |
| One to one content viewing | 1-1-cv-cm = +g.3gpp.icsi-ref="urn%3Aurn-7%3A3gpp-service.ims.iari.oma.isc.1-1-cv-cm | This IARI identifier is used when ISC user is initiating ISC session with another ISC user for content viewing and communication or content viewing only. |
| Group Content Viewing | group-cv-cm=+g.3gpp.icsi-ref="urn%3Aurn-7%3A3gpp-service.ims.iari.oma.isc.group-cv-cm | This IARI identifier is used when user is initiating content viewing and communication sessions in the ISC group. |

The ISC components reuse the Supporting Enabler ICSI (e.g., for CPM=+g.3gpp.icsi-ref="urn%3Aurn-7%3A3gpp-service.ims.icsi.oma.cpm.session) in CPM_FT, if the ISC Client request is processed by the Supporting Enabler Server components.

The ContentRef or the content ID corresponds to reference to the user selected content identified from the content list in the media function 401 for the content viewing. The content ID or the ContentRef identifies the content and is unique per content. It can be SIP Uniform Resource Identifier (URI) and/or channel number. This identifier is used in the Request-URI header of the SIP request.

The ISCConvergenceID is an ISC specific header field. Including the ISCConvergenceID in the SIP MESSAGE request or SIP INVITE request which is globally unique identifier that indicates the ISC request and response associated with an ISC content viewing and communication, content interest. All requests and responses belonging to the same ISC content viewing and communication or the same content interest carry the same value for the ISCConvergenceID header field. Sending ISC functional component includes an ISCConvergenceID header field in each SIP MESSAGE request or SIP INVITE request that are associated with the ISC content viewing and communication, content interest. The sending ISC functional component ensures that the included ISCConvergenceID is globally unique.

The synchronization field Sync in the SIP INVITE/re-INVITE request can be set (yes) or reset (no). The field and corresponding value are included in a Multipurpose Internet Mail Extensions (MIME) body of the SIP INVITE request which indicate whether the participants in the ISC session are to be synchronized for content viewing. Value "yes" indicates that both ISC Users in 1-1 session belonging to the same ISCConvergenceID should be synchronized in Content Viewing. Value "no" indicates that both ISC Users in 1-1 session belonging to the same ISCConvergenceID do not want to synchronize their Content Viewing. So ISC Server Media Function checks the value included in the "Sync" element is "yes" in the MIME SDP body of the SIP INVITE request and then generate a SIP INVITE request according to the rules and procedures of [RFC3261] and forwards it towards the recipient ISC client. Otherwise, the ISC Server Media Function does not forward the SIP INVITE request towards the recipient ISC Client.

The ISC SessionType indicates whether the initiated ISC session is for content viewing and/or communication. For example, the ISC SessionType field in the first SIP INVITE or the second SIP INVITE request includes values such as CV (Content Viewing)/CM (Communication)/CV-CM (Content Viewing and Communication). The ISC SessionType can be used by any recipient ISC client to determine whether it has to wait for another SIP INVITE after receiving a SIP INVITE which can be the first SIP INVITE or the second SIP INVITE. If ISC SessionType is CV-CM, then the recipient ISC client waits for two SIP INVITES (for content viewing and communication) before responding to the received SIP invite. Once the recipient ISC client receives both the first SIP INVITE and the second SIP INVITE, it may notify the ISC user corresponding to the recipient ISC client about the received SIP invites is for both content viewing and communication session. If the ISC SessionType is CV, then the recipient ISC client can immediately notify and respond according to the ISC user consent to the received first SIP INVITE with acceptance for content viewing session only. If the ISC SessionType is CM, then the recipient ISC client can notify immediately and respond according to the ISC user consent for the received second SIP INVITE for acceptance for communication ISC session only.

The ISC GroupID corresponds to the pre-defined ISC group for the group ISC session, the URI list corresponds to the group members in the group ISC session and the mRTSP corresponds to a request to the media function 401 to gain RTSP controls.

The method 500 allows the initiator ISC client 101 to determine which parameters from one or more first parameters is to be appended to the first SIP INVITE based on type of the ISC session request received from the ISC user. Thus, whether all or combination of one or more first parameters are appended to the first SIP INVITE is based on the type of ISC session requested by the ISC user and is described accordingly in sequence diagrams from FIG. 6 onwards.

At step 504, the method includes sending the second SIP INVITE for communication appended with one or more second parameters. In an embodiment, the method 500 allows the initiator ISC client 101 to send the second SIP INVITE for communication appended with one or more second parameters. For example, the appended one or more second parameter includes but is not limited to the ISC SessionType, the URI list and a communication session identifier assigned with the ISCConvergenceID. The communication session identifier is a communication conversation ID (CPM_Conv_ID).

Figure 6:
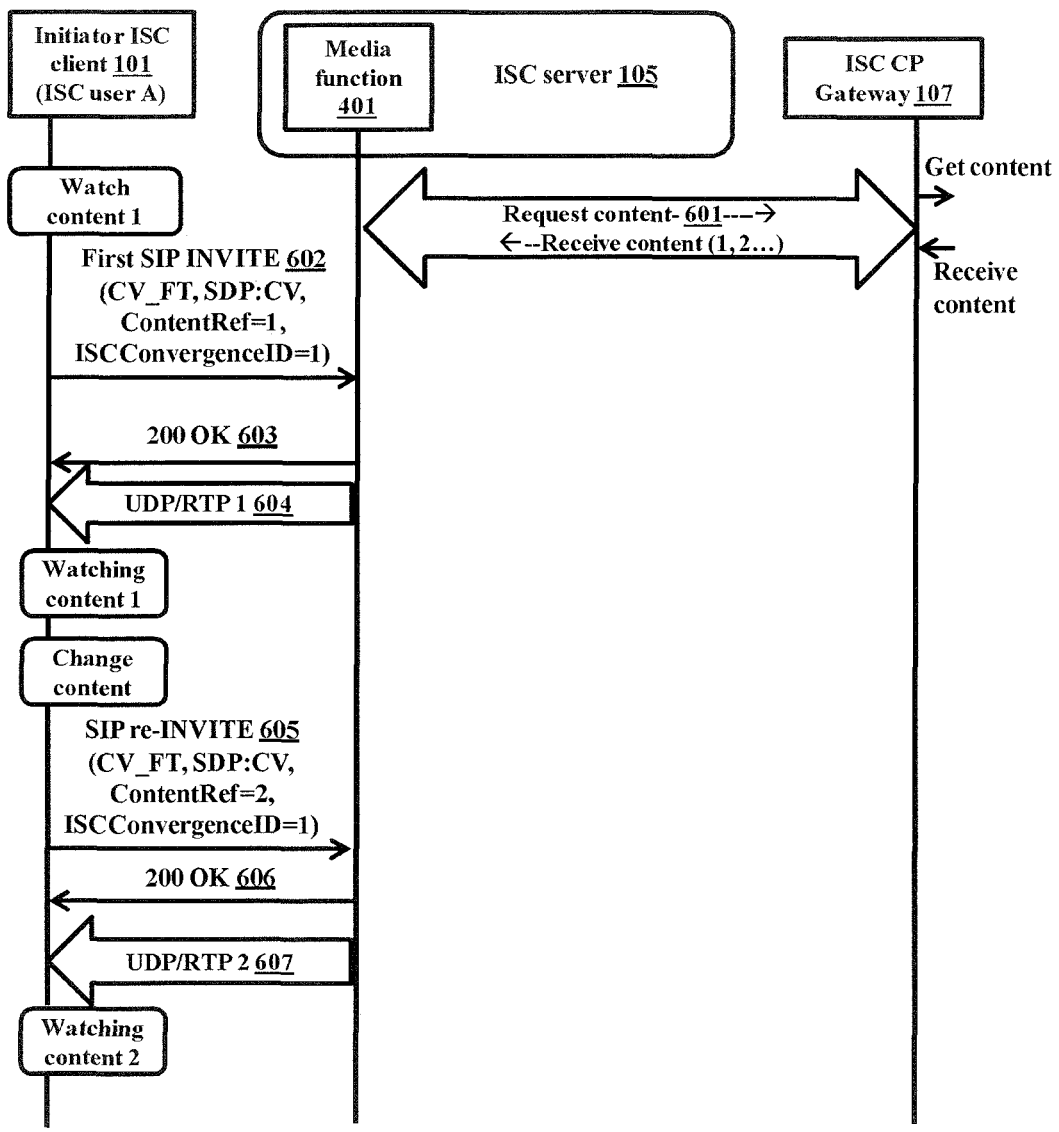
FIG. 6 is an example sequence diagram illustrating establishing of a personal ISC session for content viewing when contents are available to a ISC client of the communication device as unicast content and changing of the content being viewed is performed through a Session Initiation Protocol (SIP) re-INVITE, according to embodiments as disclosed herein.

Whether all or combination of one or more second parameters are appended to the second SIP INVITE is based on the type of ISC session requested by the ISC user and is described accordingly in sequence diagrams from FIG. 6 onwards.

At step 505, the method 500 includes establishing the ISC session for the content viewing based on received one or more first parameters. In an embodiment, the method 500 allows the media function 401 to establish the ISC session for the content viewing based on the received one or more first parameters. At step 506, the method 500 includes establishing the ISC session for the communication based on received one or more second parameters. In an embodiment, the method 500 allows the communication function 402 to establish the ISC session for the communication based on received one or more second parameters.

If it is determined that at step 502 that the initiated ISC session is for the only content viewing, then at step 507, the method 500 includes sending the first SIP INVITE for content viewing appended with one or more first parameters. In an embodiment, the method 500 allows the initiator ISC client 101 to send the first SIP INVITE for content viewing appended with one or more first parameters to the media function 401. At step 508, the method includes establishing the ISC session for the content viewing based on the received one or more first parameters. In an embodiment, the method 500 allows the media function 401 to establish the ISC session for the content viewing based on the received one or more first parameters.

If it determined at step 502 that the initiated ISC session is for the only communication, then at step 509, the method 500 includes sending the second SIP INVITE for communication appended with one or more second parameters. In an embodiment, the method 500 allows the initiator ISC client 101 to send the second SIP INVITE for communication appended with one or more second parameters. Further, the method 500 includes performing step 506 to establish the ISC session for communication.

The various actions, acts, blocks, steps, and the like in method 500 may be performed in the order presented, in a different order or simultaneously. Further, in some embodiments, some actions, acts, blocks, steps, and the like may be omitted, added, modified, skipped, and the like without departing from the scope of the invention.

FIG. 6 is the example sequence diagram illustrating establishing of the personal ISC session for the content viewing when the contents are available to the ISC client of the communication device as unicast content and changing of the content being viewed is performed through the SIP re-INVITE, according to embodiments as disclosed herein. FIG. 6 depicts the initiator ISC client 101, the ISC server 105 including the media function 401 and the communication function 402 and the ISCCPGateway 107 exchanging SIP messages for establishing content viewing for the personal ISC session. The initiator ISC client 101 already has access to the content list after the media function 401 request and receives (601) the desired contents of the content list from the content provider through the ISCCPGateway 107.

Upon receiving the request from the User to watch content, identified by the ContentRef, the initiator ISC client 101 generates the first SIP INVITE request as defined in IETF RFC 3261.

The first SIP INVITE includes:

1. The ISC feature tag CV_FT with a value as defined in Table 1 for initiating content viewing for self. CV_FT with ICSI value (+g.3gpp.icsi-ref="urn%3Aurn-7%3A3gpp-service.ims.icsi.omalsc.cv-cm) is included in Accept-Contact header field, Contact header field and P-Preferred-Service header field. And CV_FT with IARI value (+g.3gpp.icsi-ref="urn%3Aurn-7%3A3gpp-service.ims.iari.oma.isc.self-cv) is included in Accept-Contact header field.

2. Include globally unique identifier (new value is generated if it is for initiating new content viewing session otherwise from existing content viewing session) for determining the content viewing associated to ISC Convergence in the ISCConvergenceID. For example this field can be included in the SIPINVITE.

3. Include the SDP for Content Viewing as below:

3.1 Include the ContentRef corresponding to the content 1 the ISC user has selected to watch. The value of this field is obtained from the contents list. For example the value of ContentRef is included in the MIME SDP body of the SIP INVITE under new Content-Type header field "application/ISC-content-request+xml". The initiator ISC client 101 generates the first SIP INVITE as described above and sends (602) the request to the media function 401 of the ISC Server 105 with ISCConvergenceID=1 for ContentRef=1 which identifies the ISC user selected content (content 1) from the content list in the provided by the media function 401.

The values of ContentRef such as ContentRef=1, ContentRef=2 are example values representing content IDs of corresponding contents the user is interested in for the content viewing.

On receiving the first SIP invite, the media function 401 identifies that ISC feature tag received is for personal ISC session (self content viewing) which indicates the media function 401 that the received first SIP INVITE is not to be forwarded any further to any of the ISC clients in the ISC environment.

Further, the communication between the media function and the initiator ISC client continues with a SIP INVITE accept message such as a 200 OK (603) as defined in conventional SIP procedures known in the art.

In accordance with the conventional procedure used both the initiator ISC client 101 and the ISC server 105 are aware that the content identified by ContentRef from the content list is available as unicast content. Further, the media function 401 starts (604) delivering the content corresponding to ContentRef=1 in the UDP/RTP tunnel. The ISC user now watches the content as per his/her request.

Later, if the ISC user desires to change the content being viewed, then the ISC user requests the initiator ISC client 101 to change the content. The initiator ISC client 101 generates the SIP re-INVITE with parameters similar to the first SIP invite, except the ContentRef is assigned value '2' which is associated with the new selected contents. The initiator ISC client retains the value of the ISCConvergenceID=1 as assigned during the first SIP invite. Further, the initiator ISC client 101 sends (605) the SIP re-INVITE to the media function 401.

Thus, this enables the media function 401 changing of the contents in the same established ISC session without tearing down the existing ISC session.

The media function responds (606) with the 200 OK in response to the received SIP re-INVITE. Further, both initiator ISC client 101 and ISC server 105 are aware that the content identified by ContentRef=2 is available to the ISC user as unicast content according to the contents list. Further, the media function 401 starts (607) delivering the new content corresponding to ContentRef in the same UDP/RTP tunnel. The ISC user now watches the changed content (content 2) as per request.

The steps described in FIG. 6 can be adapted in embodiments based on different protocols such as an Internet Group Management Protocol (IGMP) and a Real Time Streaming Protocol (RTSP) with suitable modifications as described later in FIG. 7 and FIG. 8 respectively. However, the description common between of FIG. 6, FIG. 7 is not repeated in FIG. 7 for brevity.

Figure 7:
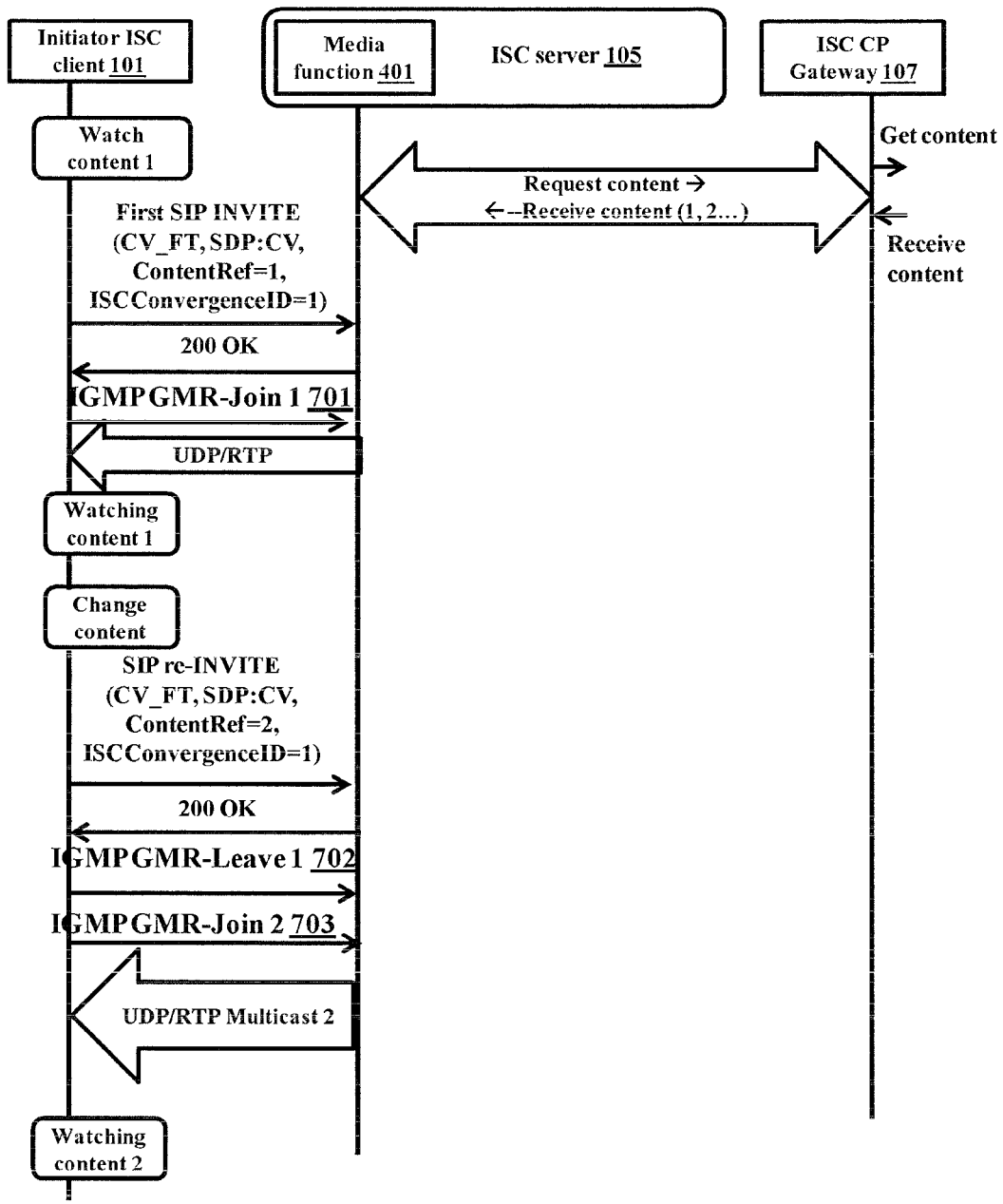
FIG. 7 is an example sequence diagram illustrating establishing of the personal ISC session for content viewing when contents are available to the ISC client as multicast content and changing of the content being viewed is performed through the SIP re-INVITE, according to embodiments as disclosed herein.

FIG. 7 is the example sequence diagram illustrating establishing of the personal ISC session for content viewing when contents are available to the ISC client as multicast content and changing of the content being viewed is performed through the SIP re-INVITE, according to embodiments as disclosed herein. The FIG. 7 depicts the personal ISC session based on the Internet Group Management Protocol (IGMP). As described in FIG. 6 suitable modifications in accordance with the corresponding technology can be adapted to establish and handle the personal ISC session based on the IGMP.

As described at 603 of FIG. 6 the media function 401 responds with the 200 OK in response to the first SIP INVITE. Further, as the initiator ISC client 101 and the ISC server 105 are aware that the content identified by ContentRef=1 is available to the ISC user as multicast content from the contents list the initiator ISC client 101 sends (701) IGMP join request towards the media function 401 for joining the multicast group address for receiving the content.

Further, after receiving the 200 OK response as described in 606 of FIG. 6 from the media function 401, the initiator ISC client 101 sends (702) IGMP leave request towards the media function 401 for departing from current watching content by specifying the multicast address and port number of the content. Further, the initiator ISC client 101 sends (703) the IGMP join request towards the media function 401 to change the content by specifying the multicast address and port number of the new content. Further, as depicted in 607 of FIG. 6 the media function 401 starts multicasting the content for ContentRef=2 in the UDP/RTP tunnel. The ISC user now watches the new content changed (content 2) as per request.

In an embodiment, on receiving the request from the ISC user to change the content being viewed, the method allows the initiator ISC client 101 to send the content change indication in the IGMP leave request itself and eliminates the need to send the SIP re-INVITE.

Figure 8:
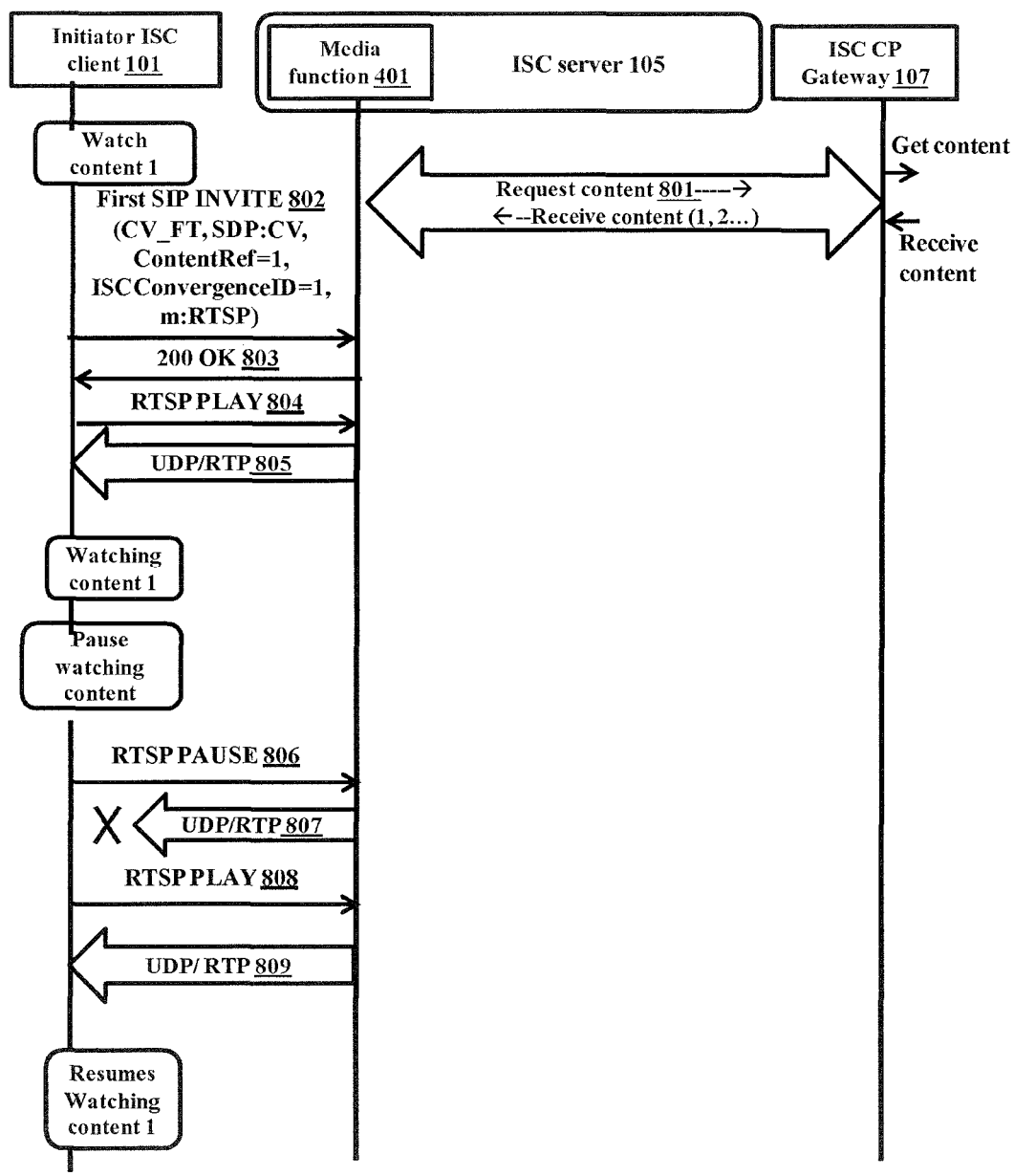
FIG. 8 is an example sequence diagram illustrating establishing of the personal ISC session for content viewing when contents are available to the ISC client as unicast content and Real Time Streaming Protocol (RTSP) controls are provided to a user of the mobile communication device, according to embodiments as disclosed herein.

FIG. 8 is the example sequence diagram illustrating establishing of the personal ISC session for content viewing when contents are available to the ISC client as unicast content and RTSP controls are provided to a user of the mobile communication device, according to embodiments as disclosed herein. The figure depicts the initiator ISC client 101, the ISC server 105 including the media function 401 and the communication function 402 and the ISCCPGateway 107 exchanging SIP messages for establishing content viewing for the personal ISC session. As the initiator ISC client 101 already has access to the content list after the media function request and receives (801) the desired contents of the content list from the content provider through the ISCCPGateway 107. The initiator ISC client sends (802) the first SIP INVITE as described in step 602. To indicate RTSP controls request to the media function, the initiator ISC client 101 includes the m-line for setting up the RTSP session in the MIME body of the SIP INVITE under new Content-Type header field "application/ISC-content-request+xml" in the first SIP invite. On receiving the first SIP invite, the media function 401 identifies that ISC feature identifier received is for personal ISC session which indicates that the received first SIP INVITE is not to be forwarded further to any of the ISC clients in the ISC environment. The media function 401 responds with (803) the SIPINVITE accept message such as the 200 OK signal. The ISC server 105 has capability to accept or reject the RTSP request for the selected content through the 200 OK signal.

As both the initiator ISC client 101 and the ISC server 105 are aware that the content identified by ContentRef is available as unicast content. Thus, the initiator ISC client 101 sends (804) RTSP PLAY request with Uniform resource locator (URL) towards the ISC Server 105 to establish a RTSP session for receiving the content identified in the ContentRef with user controls. The media function 401 starts (805) delivering the content corresponding to ContentRef=1 in the UDP/RTP tunnel (RTSP session). The ISC user watches the content as per the request. After receiving a request from the ISC user to pause the content that is being viewed, the initiator ISC client 101 sends (806) RTSP PAUSE request towards the media function 401. The ISC user is also allowed to perform other RTSP trick play commands such as FORWARD, REWIND, SKIP and the like. Upon receiving the request from the ISC Client 101 to pause the content, the media function 401 temporarily stop (807) delivering the media related to the content in the UDP/RTP tunnel (RTSP session). Upon request from the ISC user to resume the content that is being paused, the initiator ISC client 101 sends (808) RTSP PLAY request to the media function 401. Upon receiving the request from the ISC Client 101 to resume the content, the media function 401 starts delivering the temporarily halted content in the UDP/RTP tunnel (RTSP session) from the position where it stopped by the ISC user.

Figure 9:
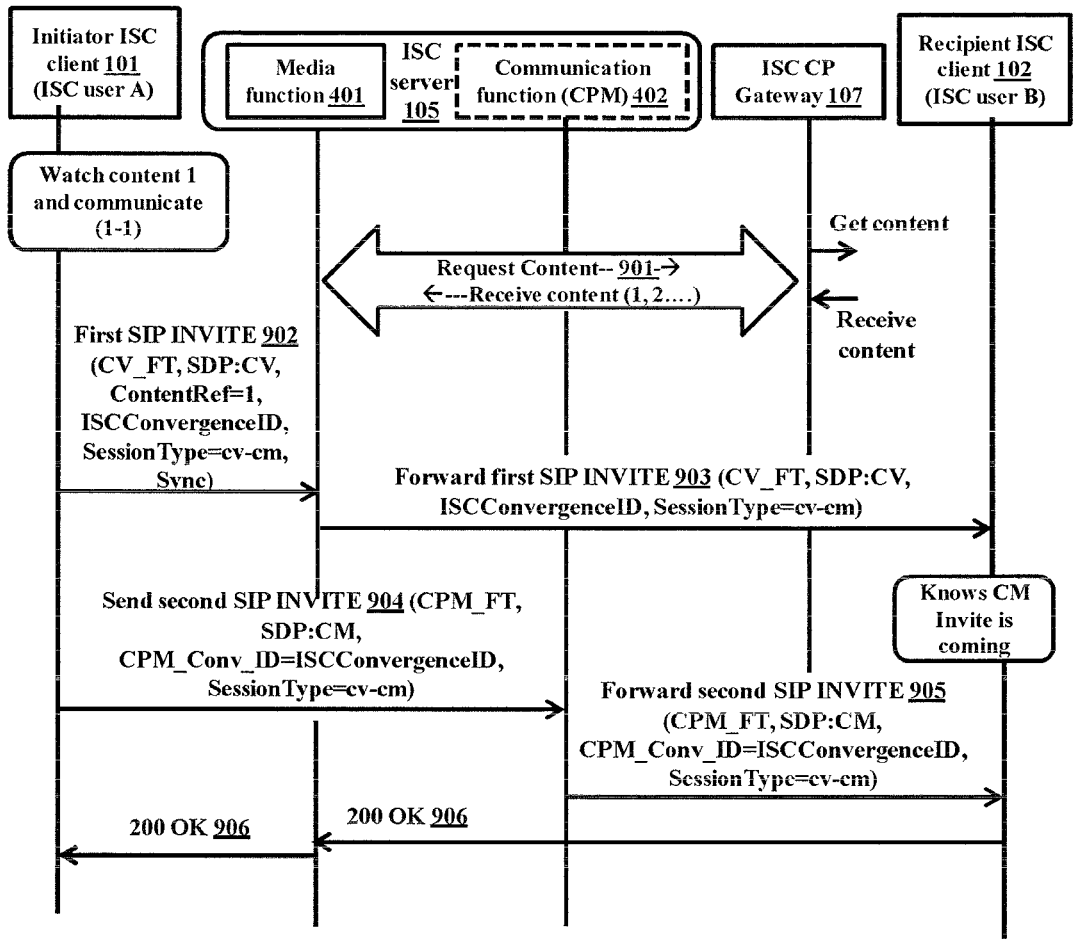
FIG. 9 is an example sequence diagram illustrating initiation of a one to one ISC session for content viewing and communication, according to embodiments as disclosed herein.

FIG. 9 is the example sequence diagram illustrating initiation of the one to one ISC session for content viewing and communication, according to embodiments as disclosed herein. The FIG. 9 depicts the initiator ISC client 101, the recipient ISC client 102, the ISC server 105 including the media function 401 and the communication function 402 and the ISC CPGateway 107 exchanging SIP messages for establishing the content viewing and the communication for the one to one (1-1) ISC session.

Upon receiving the request from the ISC user A of the communication device 100a, associated initiator ISC client 101 performs one of the following actions:

1. To watch content identified by ContentRef=1 and communicate with ISC user of communication device 100b associated with recipient ISC client 102, the initiator ISC client 101 generates two SIP INVITE (SIP invite) requests. The first SIP INVITE is towards inviting recipient ISC client 102 for content viewing and the second SIP INVITE for inviting recipient ISC client 102 for communication.

2. To watch content identified by ContentRef=1, but no communication with the ISC user B of the recipient ISC client 102, the initiator ISC client 101 generates only the first SIP INVITE towards inviting the recipient ISC client 102 for content viewing and the second SIP INVITE for communication is not generated.

3. To communicate with the recipient ISC client but not interested to watch content together, the initiator ISC client 101 generates only second SIP INVITE towards inviting the recipient ISC client for communication and the first SIP INVITE for content viewing is not generated.

The sequence diagram in the figures depicts the one-to-one ISC session for content viewing and communication. As the initiator ISC client 101 already has access to the content list after the media function 401 request and receives (901) the desired contents of the content list from the content provider through the ISC CPGateway 107. Upon receiving request by the initiator ISC client 101 for the content viewing and the communication, the initiator ISC client generates the first SIP INVITE for the content viewing as defined in IETF RFC 3261 with the following clarifications as disclosed by the method:

1. Include the ISC feature tag CV_FT with a value as defined in Table 1 for initiating 1-1 content viewing and communication. CV_FT with ICSI value (+g.3gpp.icsi-ref="urn%3Aurn-7%3A3gpp-service.ims.icsi.omalsc.cv-cm) is included in Accept-Contact header field, Contact header field and P-Preferred-Service header field and CV_FT with IARI value (+g.3gpp.icsi-ref="urn%3Aurn-7%3A3gpp-service.imslari.omalsc.1-1-cv-cm) is included in Accept-Contact header field.

2. Include globally unique identifier (new value is generated if it is for initiating new content viewing session otherwise from existing content viewing session) for determining the content viewing associated to ISC Convergence in the ISCConvergenceID. For example this field can be included in the SIP INVITE.

3. Include the SDP for content viewing and the below headers in the body 3.1. Include the ContentRef corresponding to the content the ISC user corresponding to the initiator ISC client 101 has selected to watch. The value of this field is obtained from the contents list. For example the value of ContentRef is included in the MIME SDP body of the SIP INVITE under new Content-Type header field "application/ISC-content-request+xml".

3.2. Include the ISC SessionType as CV-CM as the ISC session is for the content viewing and the communication. However, include the ISC SessionType as CV if the ISC session is only for the content viewing and include ISC SessionType as CM if the ISC session is only for the communication.

3.3. Include the synchronization field Sync which can be set (yes) or reset (no). The initiator ISC client 101 includes Sync=yes (synchronization field Sync value is set) stating both ISC users in 1-1 ISC session should be synchronized in content viewing otherwise, the initiator ISC client 101 includes Sync=no (synchronization field Sync value is set as false) stating both ISC users in 1-1 ISC session should not be synchronized in content viewing.

Upon generating the first SIP invite, the initiator ISC client 101 sends (902) the first SIP INVITE towards the media function 401. Upon receiving the first SIP INVITE request containing the ISC feature identifier value pertaining to 1-1 content viewing and communication, the media function 401 identifies that the first SIP INVITE is to be forwarded to the recipient ISC client 102. Further, the media function forwards (903) the first SIP invite to invite the recipient ISC client 102 for the 1-1 content viewing session.

For setting up the communication, the initiator ISC client generates the second SIP INVITE as defined in IETF RFC 3261 with the following clarifications:

1. Include the ISC feature tag ISCI as CPM_FT=+g.3gpp.icsi-ref="urn%3Aurn-7%3A3gpp-service.ims.icsi-.oma.cpm.session for initiating 1-1 communication session.

2. Include the ISC feature tag (IARI) CV_FT=+g.3gpp.icsi-ref="urn%3Aurn-7%3A3gpp-service.ims.iari-.oma.isc.1-1-cv-cm in the Accept-Contact header field and Contact header field for initiating 1-1 communication session.

3. For determining the communication associated to CPM Conversation copy the value of ISCConvergenceID in the CPM_Conv_ID header field which is used for 1-1 content viewing. This identifies the initiated the communication within same ISC session in which the content viewing session was initiated allowing integration of the content viewing and the communication.

4. Include the SDP for communication and below headers in the SIP INVITE body:

4.1. Include the ISC SessionType as CV-CM as the session is for the content viewing and the communication. However, if the session is only for content viewing, include session type as CV and if the session is only for communication include session type as CM. For example, this field can be included in the SIP INVITE body with new content type.

4.2. Include the ContentRef corresponding to the content the ISC user corresponding to the initiator ISC client 101 has selected to watch under new Content-Type header field "application/ISC-content-request+xml".

Further, the initiator ISC client 101 sends (904) the second SIP INVITE request towards the communication function 402 in the ISC Server 105. Further, the communication function forwards the second SIP INVITE request to the appropriate ISC client such as the recipient ISC client 102 depicted in the figure to invite for the 1-1 communication ISC session. As the SIP INVITE for communication (the second SIP INVITE)) is received on a communication client of the communication function 402, the communication client forwards (905) the second SIP INVITE to the recipient ISC client 101 if the "SessionType" is included in the second SIP INVITE received from the initiator ISC client 101.

As the method allows the initiator ISC client 101 to append the session type in both the first SIP INVITE and the second SIP invite, this enables the recipient ISC client 102 to identify the type of ISC session initiated. Thus, irrespective of whether the first SIP INVITE or the second SIP INVITE is received first by the recipient ISC client 102, the SessionType indicates the recipient ISC client 102 whether it has to immediately notify its ISC user of the received invitation or wait for one more SIP invites. For example, the recipient ISC client 102 checks if the value of "SessionType" element value is "cv-cm" in MIME SDP body with Content-Type header 'application/ISC-content-request+xml'. If yes then the ISC Client waits until SIP INVITE request for Communication with the CPM_FT 'urn:urn-7:3gpp-service.ims.icsi.oma.cpm.session' and for the same "ISCConvergenceID" is received.

If the ISC user accepts the invitation for the content viewing in the initiated ISC session, the recipient ISC client 102 responds (906) with 200 OK which is further forwarded by the media function to the initiator ISC client 101 if there are no errors to the request. If any errors are detected, the media function 401 responds with error as specified in IETF RFC 3261.

The steps described in FIG. 9 are the steps for initiating the ISC session for the content viewing and the communication. However, based on the way the content is available to the initiator ISC client 101 and the recipient ISC client 102, further steps for delivering the content in the UDP/RTP tunnel may vary and are described in FIG. 10, FIG. 11 and FIG. 12 later.

Figure 10A:
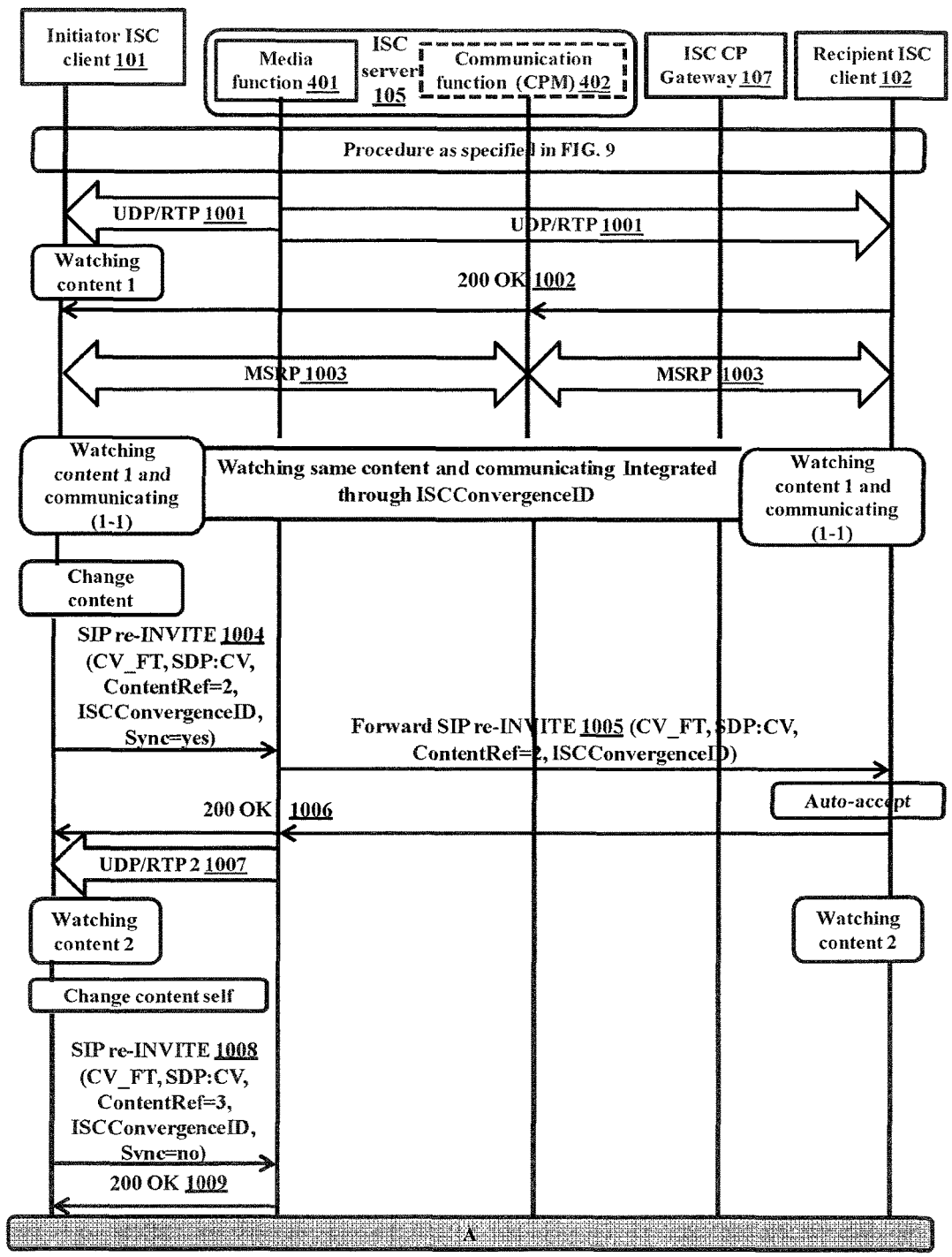
FIG. 10a,b is an example sequence diagram illustrating establishing of the one to one ISC session for content viewing and communication when contents are available to ISC clients of the mobile communication devices participating in the one to one ISC session as unicast content and changing of the content being viewed is performed through the SIP re-INVITE, according to embodiments as disclosed herein.
Figure 10B:
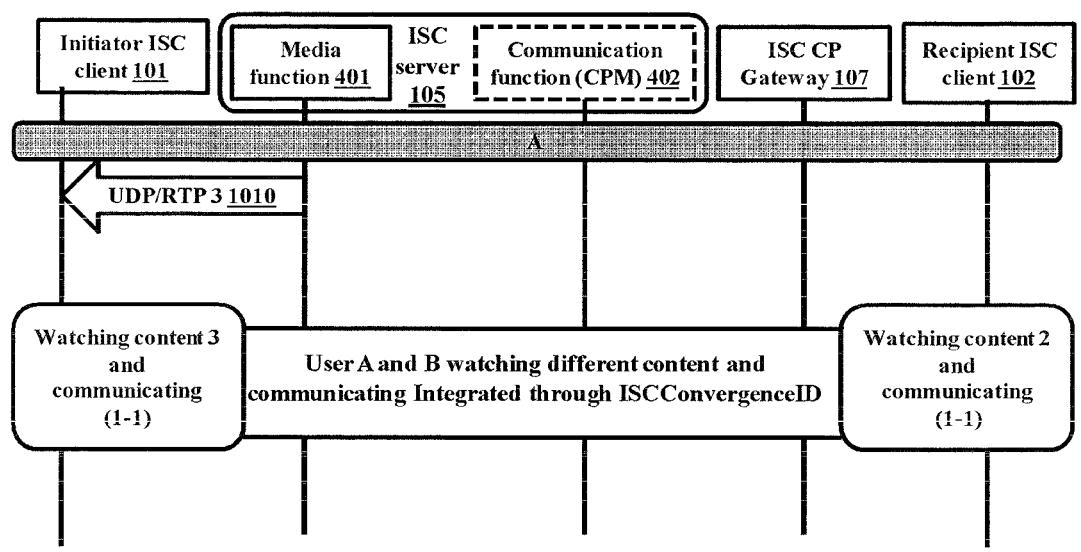

FIG. 10 is an example sequence diagram illustrating establishing of the one to one ISC session for content viewing and communication when contents are available to ISC clients of the mobile communication devices participating in the one to one ISC session as unicast content and changing of the content being viewed is performed through the SIP re-INVITE, according to embodiments as disclosed herein. The FIG. 10 depicts the initiator ISC client 101, the recipient ISC client 102, the ISC server 105 including the media function 401 and the communication function 402 and the ISC CPGateway 107 exchanging SIP messages for establishing the content viewing and the communication for the one to one (1-1) ISC session.

As described in the FIG. 9, the recipient ISC client 102 responds with the 200 OK signal in response to the received first SIP invite. Further, the media function 401 starts (1001) delivering the content corresponding to ContentRef=1 in the UDP/RTP tunnel as unicast content. Both the ISC user A and ISC user B of the initiator ISC client 101 and the recipient ISC client 102 respectively simultaneously watch the same content (specified by ContentRef=1) as per request for the 1-1 content viewing session.

Further, the recipient ISC client 102 responds with (1002) 200 OK in response to the received forwarded second SIP INVITE and the communication function 402 forwards the 200 OK to the initiator ISC client 101 if there are no errors to the request. If any errors are detected the communication function responds error as specified in IETF RFC 3261. Thereafter, the ISC users of the initiator ISC client 101 and the recipient ISC client 102 communicate (1003) with each other through a Message Session Relay Protocol (MSRP). Thus, the 1-1 integrated content viewing and the communication ISC session has been established between the ISC users. The integration is performed using globally unique ISCConvergenceID same for the initiated content viewing and the initiated communication. The CPM Client interacts with the ISC Client to render the media from Content Viewing and Communication Sessions together when the value of "ISCConvergenceID" is same.

Upon request from the ISC user of the initiator ISC client 101 to change the content that is being viewed to another content, the initiator ISC client generates the SIP re-INVITE similar to the first SIP INVITE as explained in first SIP INVITE generation above but with changed content ID (ContentRef=2) under new Content-Type header field "application/ISC-content-request+xml" with the clarification as disclosed by the method which allows addition of synchronization field Sync which can be set (yes) or reset (no).

FIG. 10 depicts the initiator ISC client 101 includes Sync=yes (synchronization field Sync value is set) stating both ISC users in 1-1 ISC session should be synchronized in content viewing. For example this field can be included in the SIP INVITE request MIME body with new content type.

Further, the initiator ISC client 101 sends (1004) the SIP re-INVITE request towards the media function 401 including the ISCConvergenceID of the existing ISC content viewing session, which then forwards (1005) the SIP re-INVITE request to the recipient ISC client 102. Thereafter the recipient ISC client 102 auto-accepts and responds with (1006) 200 OK in response including the ISCConvergenceID header field and value as received in the SIP INVITE request if there are no errors to the request. If any errors are detected the media function 401 returns error as specified in IETF RFC 3261. Further the media function forwards the 200 OK to the initiator ISC client 101. Further, the media function starts (1007) delivering the new content corresponding to ContentRef=2 in the UDP/RTP tunnel. Thus, the ISC users participating in the one to one ISC session start receiving the same media related to the content specified in the ContentRef and watch the changed content.

Upon request from the ISC user A of the initiator ISC client 101 to change the content that is being viewed to another content with the new content to be delivered only to the himself/herself, the initiator ISC client 101 generates the SIP re-INVITE for content viewing by retaining the ISC-ConvergenceID to maintain the same established ISC session. However, the SIP re-INVITE includes changed value of content ID (ContentRef=3) as per new request form the ISC user, but resets the value of the synchronization field Sync to false (Sync=no) as both the ISC user A and B participating in the one to one ISC session are not to be synchronized in content viewing. Further, the initiator ISC client 101 sends (1008) the SIP re-INVITE towards the media function 401.

The media function checks if ISC user of the initiator ISC client is authorized to watch different content in the 1-1 Content Viewing and Communication ISC session. The media function 401 responds with (1009) the 200 OK in response to the SIP re-INVITE received if there are no errors to the request. If any errors are detected the media function 401 responds with error as specified in IETF RFC 3261.

Further, the media function 401 starts (1010) delivering the content corresponding to ContentRef=3 in the UDP/RTP tunnel only to the initiator ISC client 101. Thus ISC user A watches different contents than that watched by ISC user B as per request of ISC user A.

In an embodiment the ISC user B may be notified that the ISC user A is watching different content subsequent to subscription of ISC Event Package.

Thus, the one to one ISC session for the content viewing and the communication session are continued with ISC user A watching different content and communicating with ISC user B integrated through ISCConvergenceID.

The steps described in FIG. 10 can be adapted in embodiments based on different protocols such as the IGMP and the RTSP with suitable modifications as described later in FIG. 11 and FIG. 12 respectively. However, the description common between of FIG. 10, FIG. 11 is not repeated in FIG. 11 for brevity.

Figure 11A:
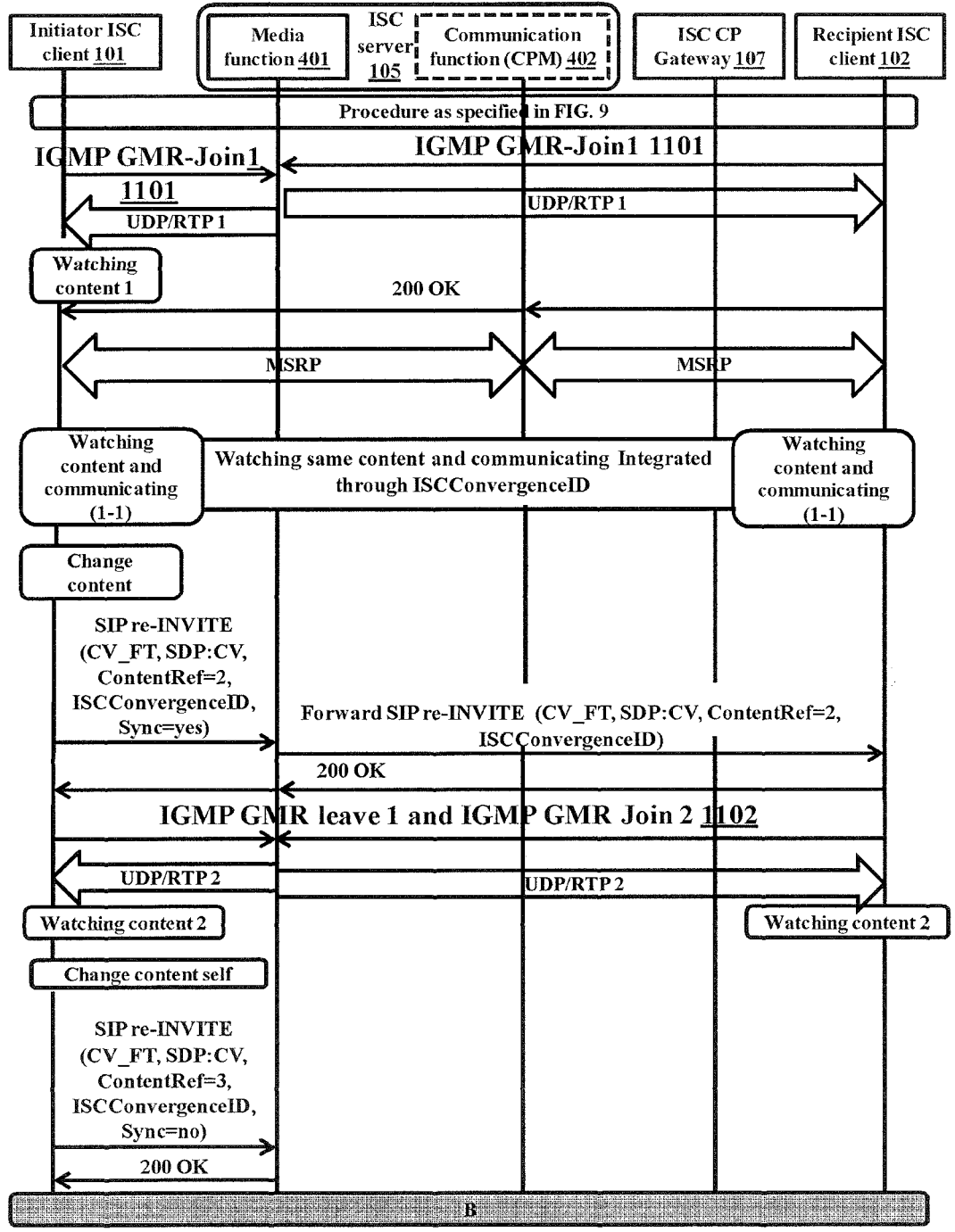
FIG. 11a,b is an example sequence diagram illustrating establishing of the one to one ISC session for content viewing and communication when contents are available to the ISC clients as multicast and changing of the content being viewed is performed through the SIP re-INVITE, according to embodiments as disclosed herein.
Figure 11B:
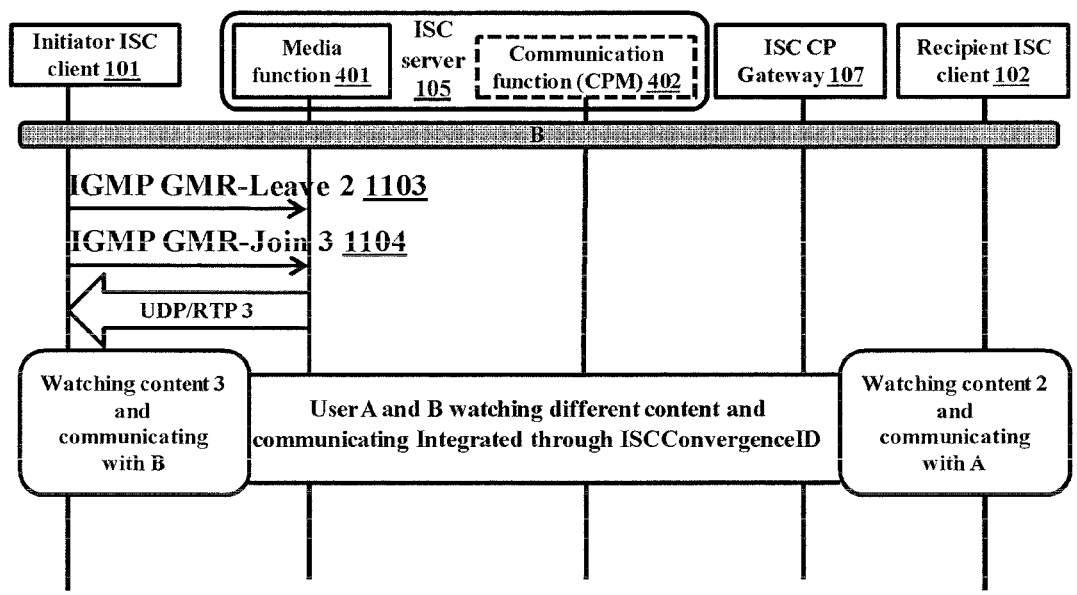

FIG. 11 is the example sequence diagram illustrating establishing of the one to one ISC session for content viewing and communication when contents are available to the ISC clients as multicast and changing of the content being viewed is performed through the SIP re-INVITE, according to embodiments as disclosed herein.

The FIG. 11 depicts the one to one ISC session based on the Internet Group Management Protocol (IGMP). As described in FIG. 10 suitable modifications in accordance with the corresponding technology can be adapted to establish and handle the one to one ISC session based on the IGMP as depicted in the FIG. 11 including but not limited to IGMP-GMR Join 1 (1101), IGMP GMR leave 1 and IGMP GMR Join 2 (1102), IGMP GMR leave 2 (1103) and IGMP GMR Join 3 (1104).

Thus, the one to one ISC session for the content viewing and the communication session continues with ISC user A watching different content and communicating with ISC user B integrated through ISCConvergenceID.

Figure 12:
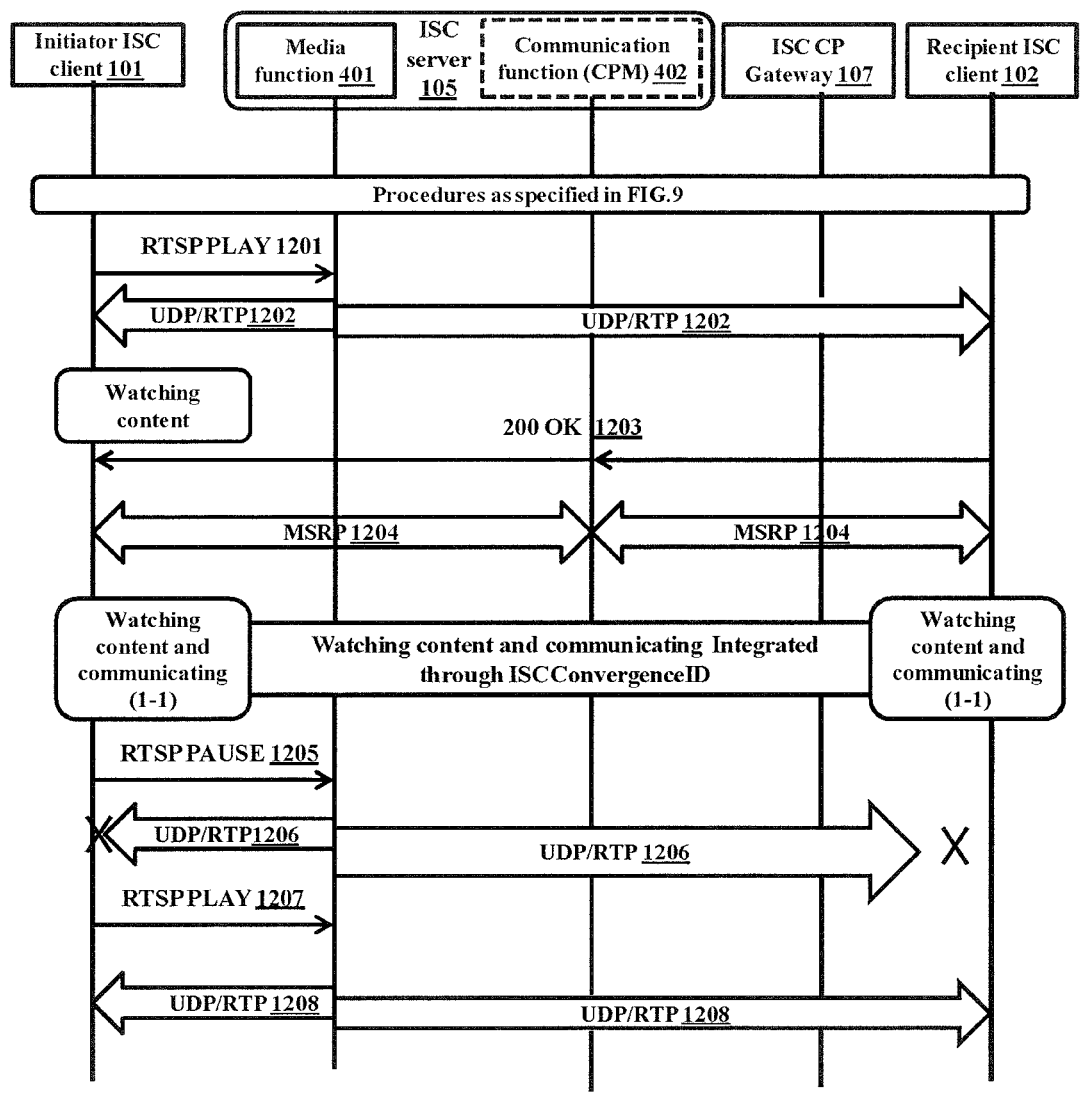
FIG. 12 is an example sequence diagram illustrating establishing of the one to one ISC session for content viewing and communication when contents are available to the ISC clients as unicast content and RTSP controls are provided to the user, according to embodiments as disclosed herein.

FIG. 12 is the example sequence diagram illustrating establishing of the one to one ISC session for content viewing and communication when contents are available to the ISC clients as unicast content and RTSP controls are provided to the user, according to embodiments as disclosed herein. The FIG. 12 depicts the initiator ISC client 101, the recipient ISC client 102, the ISC server 105 including the media function 401 and the communication function 402 and the ISC CPGateway 107 exchanging SIP messages for establishing the content viewing and the communication for the one to one (1-1) ISC session with RTSP controls.

As described in the FIG. 9, the recipient ISC client 102 responds with the 200 OK signal in response to the received first SIP INVITE (The ISC client 101 sends (902) first SIP INVITE request by including the m-line for setting up the RTSP session in the MIME body of the SIP INVITE under new Content-Type header field "application/ISC-content-request+xml" in addition (the SDP body contains media descriptions matching the requested media streams in the m-line for setting up the RTSP session according to the rules and procedures of [RFC2326] and [RFC4567]) to the media function 401). As both the initiator ISC client 101 and the recipient ISC client 102 and the media function 401 are aware that content identified by ContenRef is available as unicast content. Thus, the initiator ISC client 101 sends (1201) the RTSP play. Further, the media function 401 starts (1202) simultaneously delivering the content corresponding to ContentRef=1 in the UDP/RTP tunnel (RTSP session) as unicast content to both the ISC user A and the ISC user B of the initiator ISC client 101 and the recipient ISC client 102 respectively as per request received from the ISC user A for the 1-1 content viewing session.

Further, the recipient ISC client 102 responds with (1203) 200 OK in response to the received forwarded second SIP INVITE and the communication function 402 forwards the 200 OK to the initiator ISC client 101 if there are no errors to the request. If any errors are detected the communication function responds with error as specified in IETF RFC 3261. Thereafter, the ISC users of the initiator ISC client 101 and the recipient ISC client 102 communicate (1204) with each other through the MSRP. Thus, the 1-1 integrated content viewing and the communication ISC session has been established between the ISC user A and B. The integration is performed using globally unique ISCConvergenceID same for the initiated content viewing and the initiated communication.

Upon receiving the request from the ISC user A to pause the content that is being viewed, the initiator ISC client sends (1205) RTSP PAUSE request towards the media function 401. The ISC user is also allowed to perform other RTSP trick play commands such as FORWARD, REWIND, SKIP and the like. Upon receiving the request from the ISC Client 101 to pause the content, the media function temporarily stop (1206) delivering the media related to the content in the UDP/RTP tunnel (RTSP session) to both the initiator ISC client 101 and the recipient ISC client 102.

Unlike the existing method, the method allows RTSP controls to be controlled by only one participant in the ISC session such as the initiator ISC client 101.

In an embodiment, the RTSP control rights can be given to the recipient ISC client.

Upon request from the ISC user A to resume the content that is being paused, the initiator ISC client sends (1207) RTSP PLAY request towards the media function 401. Upon receiving the request from the ISC Client 101 to resume the content, the media function 401 starts (1208) delivering the temporarily halted content to both the initiator ISC client 101 and the recipient ISC client 102 in the RTSP session from the position, where it was stopped by the ISC user A.

Figure 13:
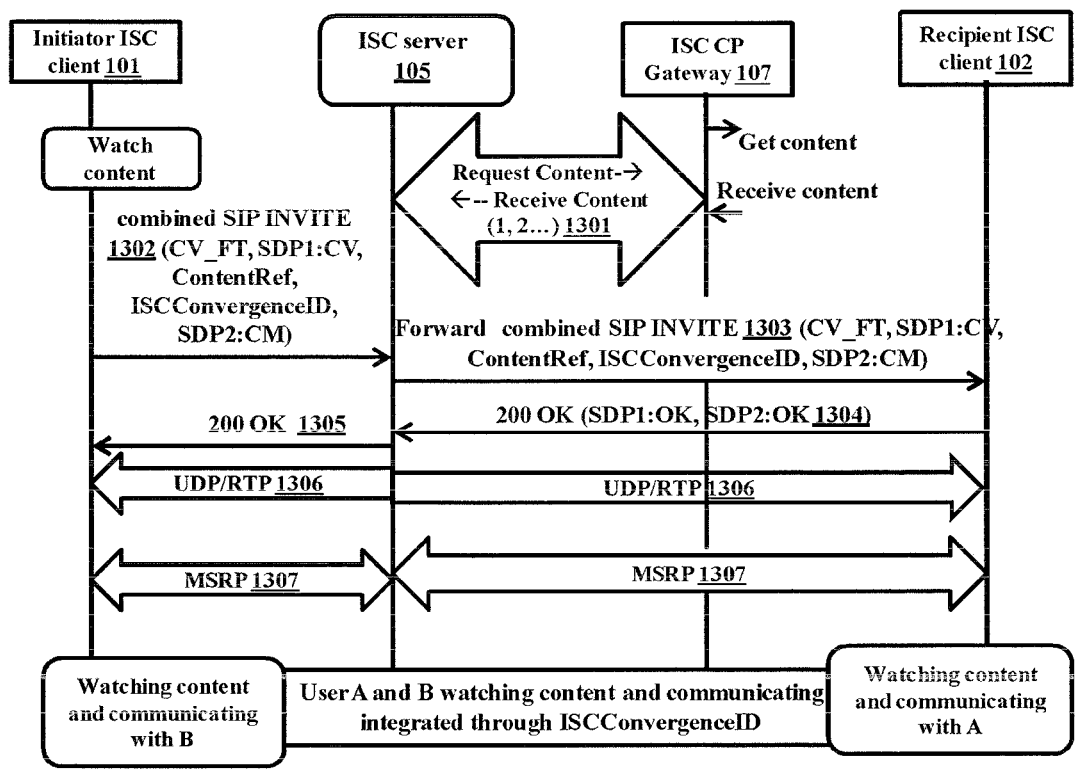
FIG. 13 is an example sequence diagram illustrating establishing of the one to one ISC session for content viewing and communication when a media function and a communication function are integrated in a ISC server, according to embodiments as disclosed herein.

FIG. 13 is the example sequence diagram illustrating establishing of the one to one ISC session for content viewing and communication when a media function and a communication function are integrated in the ISC server, according to embodiments as disclosed herein. The FIG. 13 depicts the initiator ISC client 101, the recipient ISC client 102, the ISC server 105 with the media function 401 and the communication function 402 integrated and the ISC CPGateway 107 exchanging SIP messages for establishing content viewing for the one to one ISC session. As the initiator ISC client 101 already has access to the content list after the media function request and receives (1301) the desired contents of the content list from the content provider through the ISC CPGateway 107.

As depicted in the FIG. 13 upon receiving the request from the ISC user A to watch content identified by ContentRef, and communicate with ISC user B, the initiator ISC client generate a combined SIP INVITE request with two m-lines. The two m-lines include the SDP for content viewing for inviting the ISC user B towards content viewing and the SDP for communication for inviting the ISC user B for communication.

However, if request received is for watching content identified by ContentRef, but no communication with ISC User B, then initiator ISC client 101 generates the combined SIP INVITE but does not include m-line for communication.

If the request received is for communicating but not for watching contents, then initiator ISC client 101 generates the combined SIP INVITE but does not include mine for content viewing.

In response to the request for content viewing and communication the initiator ISC client performs following actions:

1. Include the feature tag CV_FT which is for initiating 1-1 content viewing and communication ISC session. For example the value of this feature tag could be +g.3gpp.icsi-ref="urn%3Aurn-7%3A3gpp-service.ims.icsi.omaisc.1-1-cv-cm"

2. Include the ContentRef corresponding to the content the ISC user A has selected to watch. The value of this field is obtained from the contents list.

3. Include globally unique identifier for determining the Content Viewing associated to ISC Convergence in the ISCConvergenceID.

4. Include both m-line as the ISC session initiated is for both content viewing and communication.

Further the initiator ISC client 101 sends (1302) the single combined SIP INVITE request towards the ISC Server 105.

The ISC Server responds with a 200 OK in response to the SIP INVITE received if there are no errors to the request. If any errors are detected the ISC Server media function responds with error as specified in IETF RFC 3261.

Upon receiving the request from the ISC user A, the ISC Server Media Function 401 forwards (1303) the combined SIP INVITE request to recipient ISC client 102 being invited to the 1-1 content viewing session.

Further, the recipient ISC client 102 responds with 200 OK with SDP1:OK, SDP2:OK (combined SIP INVITE accept message) in response to the forwarded combined SIP INVITE received if there are no errors to the request, stating the ISC user B accepts both the content viewing and the communication with ISC user A. If any errors are detected the ISC Server Media function 401 return error as specified in IETF RFC 3261. The ISC Server Media Function forwards the 200 OK to the initiator ISC Client 102.

Further, the ISC Server Media Function 401 starts 1306) delivering the content corresponding to ContentRef in the UDP/RTP tunnel. ISC users A and B have started watching the content as per request in the 1-1 Content Viewing session. Further, ISC users A and B start communicate with each other and 1-1 the content viewing and communication session is established between ISC users A and B. Now ISC users A and B are watching the same content and communicating each other integrated through ISCConvergenceID.

Figure 14:
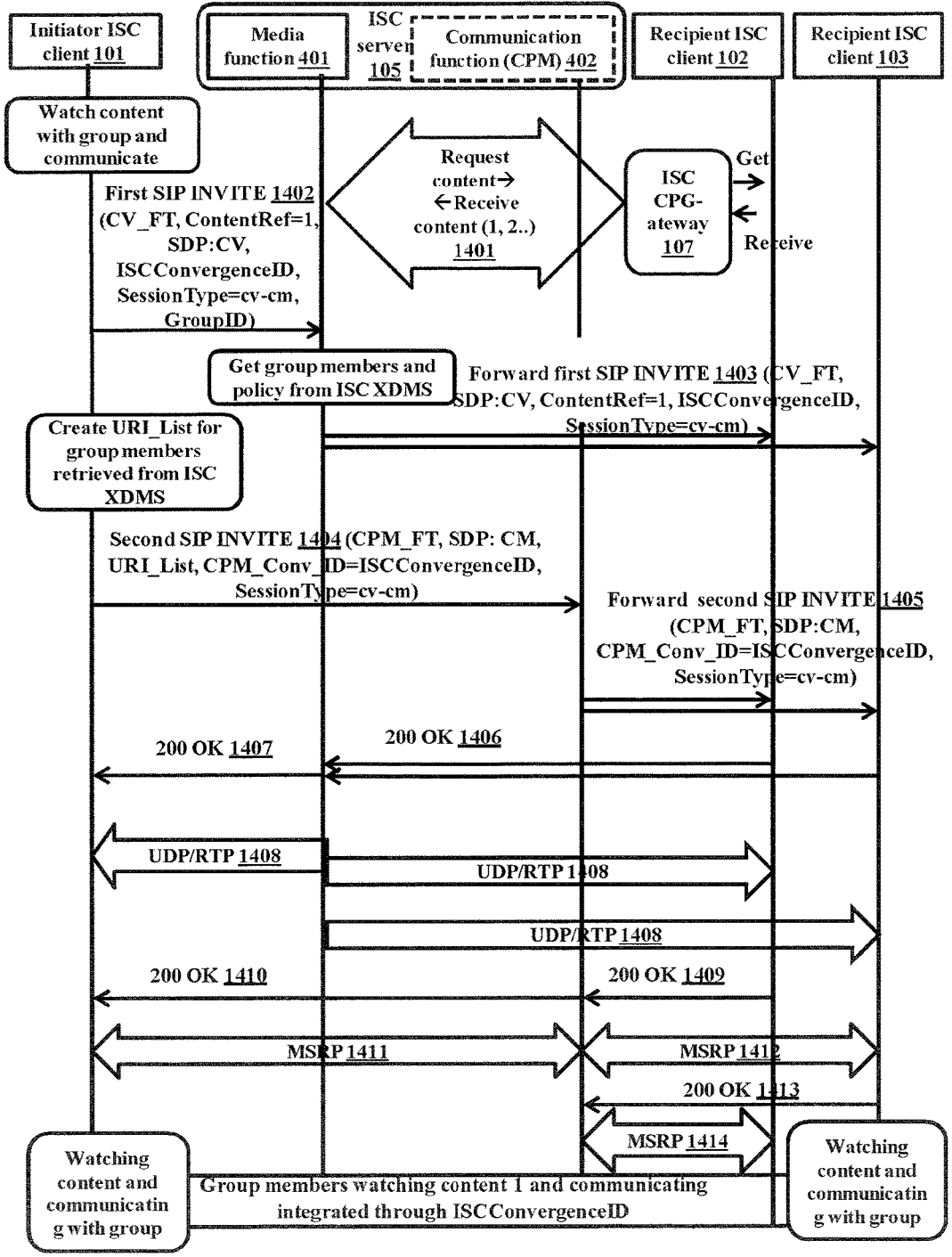
FIG. 14 is an example sequence diagram illustrating establishing of a group ISC session among a pre-defined group for content viewing and communication when contents are available to the ISC clients of the pre-defined group as unicast content, according to embodiments as disclosed herein.

FIG. 14 is the example sequence diagram illustrating establishing of the group ISC session among the pre-defined group for content viewing and communication when contents are available to the ISC clients of the pre-defined group as unicast content, according to embodiments as disclosed herein.

The FIG. 14 depicts the initiator ISC client 101, the recipient ISC client 102, the recipient ISC client 103, the ISC server 105 including the media function 401 and the communication function 402 and the ISC CPGateway 107 exchanging SIP messages for establishing the content viewing and the communication for the group ISC session. As the initiator ISC client 101 already has access to the content list after the media function request and receives (1401) the desired contents of the content list from the content provider through the ISC CPGateway 107.

As discussed for the personal ISC session establishment and one to one ISC session establishment, the method allows the initiator ISC client 101 to generate the first SIP INVITE and/or the second SIP INVITE based on the request from the ISC user A for establishing the group ISC session for the content viewing and/or the communication.

For the group ISC session the first SIP INVITE for the content viewing is generated as defined in IETF RFC 3261 with the following clarifications provided by the method disclosed:

1. Include the ISC GroupID that corresponds to group address of the pre-defined ISC group. For example in the Request-URI 2. Include the ISC feature tag CV_FT which is for initiating group content viewing and communication for the pre-defined ISC group. CV_FT with ICSI value (+g.3gpp.icsi-ref="urn%3Aurn-7%3A3gpp-service.ims.icsi-.omalsc.cv-cm) is included in Accept-Contact header field, Contact header field and P-Preferred-Service header field. And CV_FT with IARI value (+g.3gpp.icsi-ref= "urn%3Aurn-7%3A3gpp-service.ims.iari.oma.isc.group-cv-cm) is included in Accept-Contact header field.

3. Include globally unique identifier (new value is generated if it is for initiating new content viewing session otherwise from existing content viewing session) for determining the content viewing associated to ISC convergence in the ISCConvergenceID.

4. Include the SDP for unicast content viewing and below headers in the SIP INVITE body 4.1. Include the ContentRef corresponding to the content the ISC user A has selected to watch. The value of this field is obtained from the contents list. For example the value of ContentRef is included in the MIME SDP body of the SIP INVITE under new Content-Type header field "application/ISC-content-request+xml".

4.2. As described for the personal ISC session or the one to one ISC session include ISC SessionType as CV-CM as the session is for content viewing and communication. However, include SessionType as CV if the session is only for content viewing and as CM if the session is only for communication.

Further, the initiator ISC client 101 sends (1402) the first SIP INVITE request towards the media function 401.

Upon receiving the first SIP INVITE request from the initiator ISC client 101 containing the feature tag value pertaining to group content viewing and communication for the group ISC session, the media function 401 retrieves the group members of the pre-defined group and the policy corresponding to the ISC GroupID received in first SIP INVITE request, from the ISC XDMS 106. For example the policy allows the media function to priory know which of the group members carries the group controls.

Further, the media function 401 forwards (1403) the first SIP INVITE request towards each group member including recipient ISC client 102 and 103 respectively, belonging to the predefined group identified from the ISC GroupID specified in the received first SIP invite.

Further, for setting up the communication, the initiator ISC client 101 fetches the group members from the ISC XDMS 106 if the communication function does not have access to the group information defined in ISC XDMS 106. The initiator ISC client 101 generates the second SIP INVITE request as defined in IETF RFC 3261 with the following clarifications as provided by the method disclosed:

1. Include ISC GroupID if the communication function has access to the pre-defined group in ISC XDMS 106, else include URI list as obtained above.

2. Include the feature tag ICSI as CPM_FT=+g.3gpp.icsi-ref="urn%3Aurn-7%3A3gpp-service.ims.icsi.oma.cpm.session which is for initiating group communication session.

3. For determining the communication associated to CPM Conversation copy the value of ISCConvergenceID in the CPM_Conv_ID header field which is used for content viewing. This identifies the initiated the communication within same ISC session in which the content viewing session was initiated allowing integration of the content viewing and the communication.

4. Include the SDP for the communication and below headers in the SIP INVITE body 4.1. Include ISC SessionType as CV-CM as the session is for the content viewing and communication, as CV if the session is only for content viewing and as CM if the session is only for communication. However, include session type as CV if the session is only for content viewing and as CM if the session is only for communication. For example this field can be included in the SIP INVITE body with new content type.

Further, the initiator ISC client 101 sends (1404) the second SIP INVITE request towards the communication function 402.

The communication function forwards (1405) the second SIP INVITE towards request to each group member as the ISC SessionType is included in the received second SIP INVITE request.

As the method allows the initiator ISC client 101 to append the session type in both the first SIP INVITE and the second SIP invite, this enables the recipient ISC client 102 to identify the type of ISC session initiated. The recipient ISC client 102 checks if the value of "SessionType" element value is "cv-cm" in MIME SDP body with Content-Type header 'application/ISC-content-request+xml'. If yes then the ISC Client waits until SIP INVITE request for Communication with the CPM_FT 'urn:urn-7:3gpp-service.ims.icsi.oma.cpm.session' and for the same "ISCConvergenceID" is received. As the content viewing and the communication SIP messages are received by the recipient ISC clients 102 and 103 respectively, the recipient ISC clients return 200 OK (1406 and 1409 respectively) in response to the first SIP INVITE and the second SIP INVITE respectively. Whenever there are any errors to the request the media function 401 and the communication function return error as specified in IETF RFC 3261.

The media function 401 and the communication function 402 forward (1407 and 1410 respectively) the 200 OK to the initiator ISC client 101.

Further, after sending the 200 OK the media function starts (1408) delivering the content corresponding to ContentRef in the UDP/RTP tunnel to all the group members. Simultaneously, the communication function 402 allows the group members to communication through the MSRP (1411). Thus, the content viewing along with the communication for the group ISC session is established and integrated through ISCConvergenceID.

The steps described in FIG. 14 can be adapted in embodiments based on different protocols such as the IGMP and the RTSP with suitable modifications in accordance with the corresponding technology.

As a person skilled in the art understands, removal of a participant from the ISC session, addition of a new participant to the ISC session from content viewing and/or communication or accepting leave request from an existing participant from the ISC session is within the scope of the method disclosed. This can be performed using conventional procedures known in the art combined with the embodiments of the method disclosed using the parameters including but not limited to ISC GroupID and ISCConvergenceID.

In an embodiment, for addition of a new ISC user the initiator ISC client client generates SIP REFER request as specified in RFC 3515 with the following clarifications provided by the method disclosed by:

1. Include group identity (ISC GroupID) of the ongoing ISC group session (group ISC session).

2. Include the feature tag based on whether the initiation of SIP REFER is for the content viewing and/or the communication.

3. Include address of the recipient ISC client in Refer-to header called a client ID. If more than one ISC user is invited, the Refer-To header includes a pointer to URI-List in the body and includes the URI-List in the body.

4. Include method parameter of the Refer-to header as INVITE

5. Include the ContentRef corresponding to the content user has selected to watch. In an embodiment additional content information corresponding to the current content being watched by the existing group members is included to provide additional information to the invitee.

6. Include globally unique identifier (from existing content viewing session) for determining the content viewing associated to ISC Convergence in the ISCConvergenceID.

7. Include the SDP for unicast content viewing and below headers in the body.

8. Include the ISC SessionType.

In an embodiment, the existing ISC user of the on-going group ISC session can be terminated using SIP REFER and SIP BYE messages of the conventional procedure with suitable modification similar to the procedure described for adding the ISC user.

In an embodiment, the ISC user desiring to leave the content viewing and/or communication indicates the desire and the ISC client associated with the ISC user generates and sends the SIP BYE. The SIP BYE includes ongoing ISC GroupID, the feature tag ICSI, the SessionType based on whether the termination is for content viewing and/or communication. Further, based on the session type the SIP BYE messages can be sent towards the media function and/or the communication function respectively.

Figure 15:
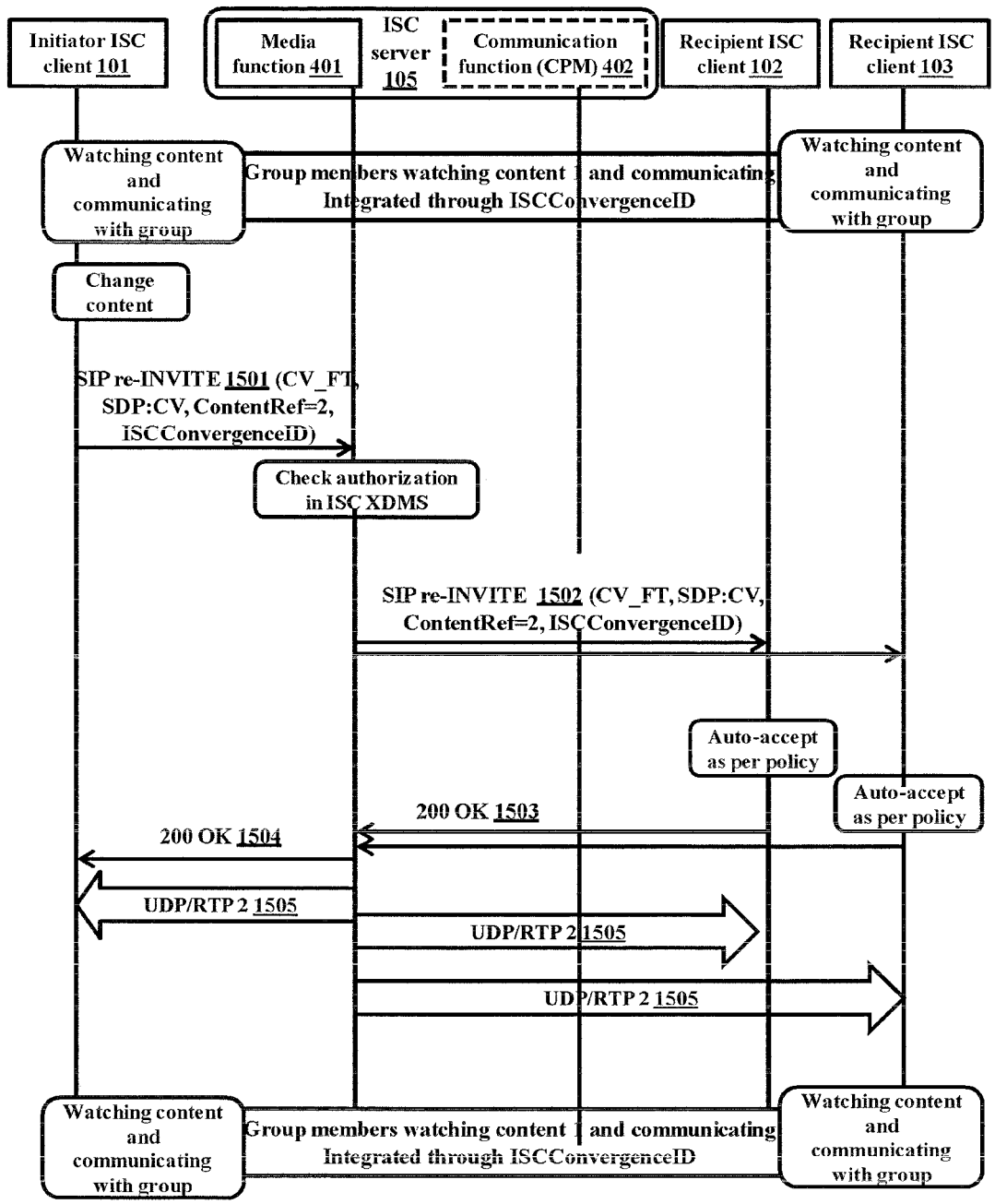
FIG. 15 is an example sequence diagram illustrating changing the content being viewed by the pre-defined group through the SIP re-INVITE when contents are available to the ISC clients of the as unicast content during the group ISC session, according to embodiments as disclosed herein.

FIG. 15 is the example sequence diagram illustrating changing the content being viewed by the pre-defined group through the SIP re-INVITE when contents are available to the ISC clients of the as unicast content during the group ISC session, according to embodiments as disclosed herein. The FIG. 15 depicts the initiator ISC client 101, the recipient ISC client 102, the recipient ISC client 103, the ISC server 105 with the media function 401 and the communication function 402 exchanging SIP messages for content viewing and the communication for the group ISC session. The FIG. 15 depicts group members of the pre-defined group are watching the same content and communicating each other integrated through ISCConvergenceID.

Upon request from the group member (here the initiator ISC client 101) to change the content that is being viewed to another content, the initiator ISC 101 generates the SIP re-INVITE for the SIP re-INVITE for the personal ISC session or the one to one ISC session including the new ContentRef with value of ContentRef=2 corresponding to the content being selected by the ISC user A associated with the initiator ISC client 101.

Further, the initiator ISC client sends (1501) the SIP re-INVITE request towards the media function 401.

The media function 401 checks the group policy in the ISC XDMS 106 to confirm whether the requesting ISC user is authorized to change the content. If the ISC user is not authorized, the request of the requesting group member is returned with error.

Further, the media function 401 (1502) forwards the SIP re-INVITE request to the remaining group members (recipient ISC clients 102 and 103 respectively) in the current established ISC session.

In an embodiment, the method does not include the synchronization field Sync in the SIP re-INVITE; instead synchronization of the content viewing among group members can be a default setting of the group ISC session.

In an embodiment, the participants of the group ISC session (group members) such as the recipient ISC clients 102 and 103 respectively auto accept the received SIP re-INVITE request.

In an embodiment, the ISC clients 102 and 103 can notify change of content to their respective ISC users and reply in accordance with their ISC users' response.

Further, the recipient ISC client 102 and 103 respectively return (1503) 200 OK in response to the SIP re-INVITE. The media function forwards (1504) the 200 OK to the initiator ISC client 101. Thereafter, the media function 401 starts (1505) delivering the content corresponding to new ContentRef in the UDP/RTP2 tunnel. The group members now watch the changed content as per request of the authorized group member.

Figure 16:
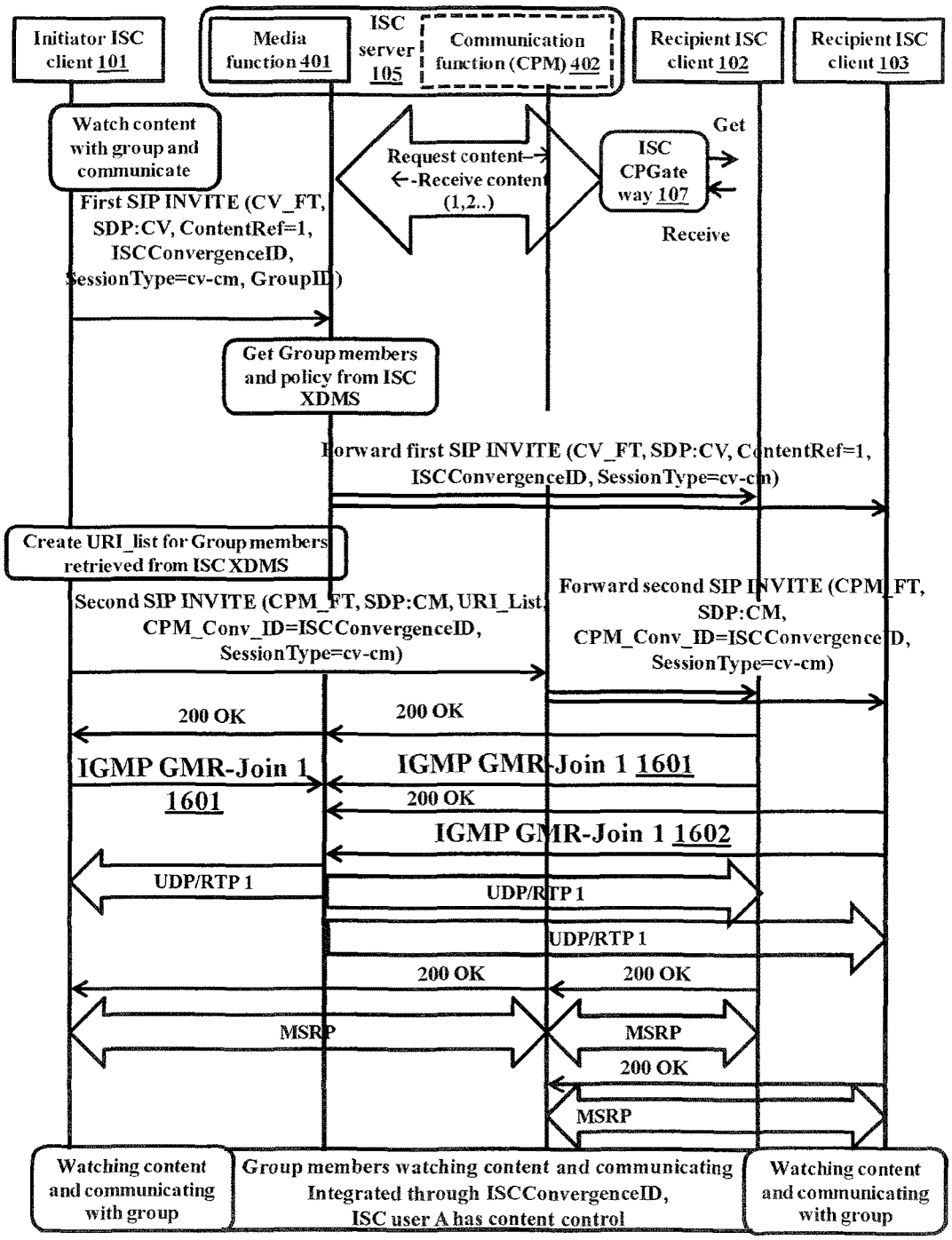
FIG. 16 is an example sequence diagram illustrating establishing of the group ISC session among the pre-defined group for content viewing and communication when contents are available to the ISC clients in the pre-defined group as multicast, according to embodiments as disclosed herein.

FIG. 16 is an example sequence diagram illustrating establishing of the group ISC session among the pre-defined group for content viewing and communication when contents are available to the ISC clients in the pre-defined group as multicast, according to embodiments as disclosed herein.

The FIG. 16 depicts the group ISC session based on the IGMP. As described in FIG. 14 suitable modifications in accordance with the corresponding technology can be adapted to establish and handle the group ISC session based on the IGMP as depicted in the FIG. 16. including but not limited to IGMP-GMR Join 1 (1601) and IGMP GMR Join 1 (1602). Thus, group ISC session, integrated through ISCConvergenceID, for the content viewing and the communication is established based when IGMP is utilized.

As a person skilled in the art understands, removal of a participant form the ISC session, addition of a new participant to the ISC session or terminating an existing participant from the ISC session is within the scope of the method disclosed and can be performed using conventional procedures known in the art combined with the method disclosed.

Figure 17:
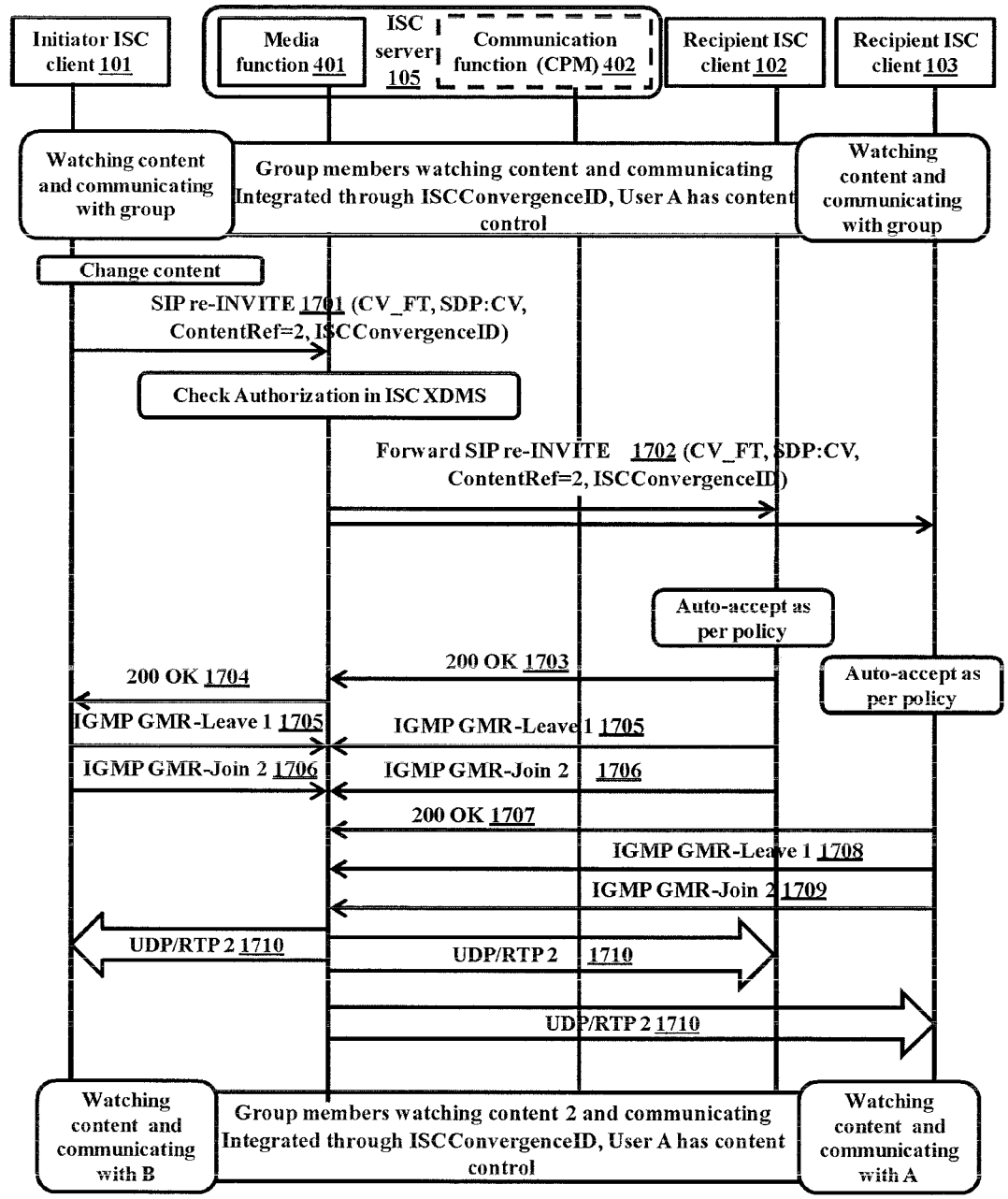
FIG. 17 is an example sequence diagram illustrating changing the content being viewed by the pre-defined group through the SIP re-INVITE when contents are available to the ISC clients of the pre-defined group as multicast content during the group ISC session, according to embodiments as disclosed herein.

FIG. 17 is the example sequence diagram illustrating changing the content being viewed by the pre-defined group through the SIP re-INVITE when contents are available to the ISC clients of the pre-defined group as multicast content during the group ISC session, according to embodiments as disclosed herein. The FIG. 17 depicts the initiator ISC client 101, the recipient ISC client 102, the recipient ISC client 103, the ISC server 105 including the media function 401 and the communication function 402 exchanging SIP messages for the content viewing and the communication for the group ISC session. The FIG. 17 depicts group members of the pre-defined group are watching the same content and communicating each other, integrated through ISCConvergenceID.

Upon request from the group member (here the initiator ISC client 101) to change the content that is being viewed to another content, initiator ISC client 101 generates the SIP re-INVITE including the new ContentRef (ContentRef=2) corresponding to the content being selected by the ISC user A of the initiator ISC client 101.

Further, the initiator ISC client sends (1701) the SIP re-INVITE request towards the media function 401.

The media function checks the group policy in the ISC XDMS 106 to confirm whether the requesting ISC user is authorized to change the content. If not authorized, requesting group member is returned with error.

Further, the media function 401 (1702) forwards the SIP re-INVITE request to the remaining group members (recipient ISC clients 102 and 103 respectively) in the current established ISC session.

In an embodiment, in order for the other participating group members to receive the same content, the recipient ISC clients 102 and 103 respectively can auto accept the received SIP re-INVITE request.

Further, the recipient ISC client 102 and 103 respectively return (1703 and 1707) 200 OK in response to the SIP re-INVITE. On reception of the 200 OK signal from at least one of the recipient ISC client, the media function forwards (1704) the 200 OK to the initiator ISC client 101. After signaling corresponding to the 200 OK is completed, the participating group members perform the IGMP leave (1705 and 1708) and IGMP join (1706 and 1709) to receive the changed contents (ContentRef=2) through multicast content. Further, the media function 401 delivers (1710) the contents requested by the ISC user A of the initiator ISC client 101 with content corresponding to new ContentRef in the UDP/RTP tunnel. The group members now watch the changed content as per request of the authorized group member.

Figure 18A:
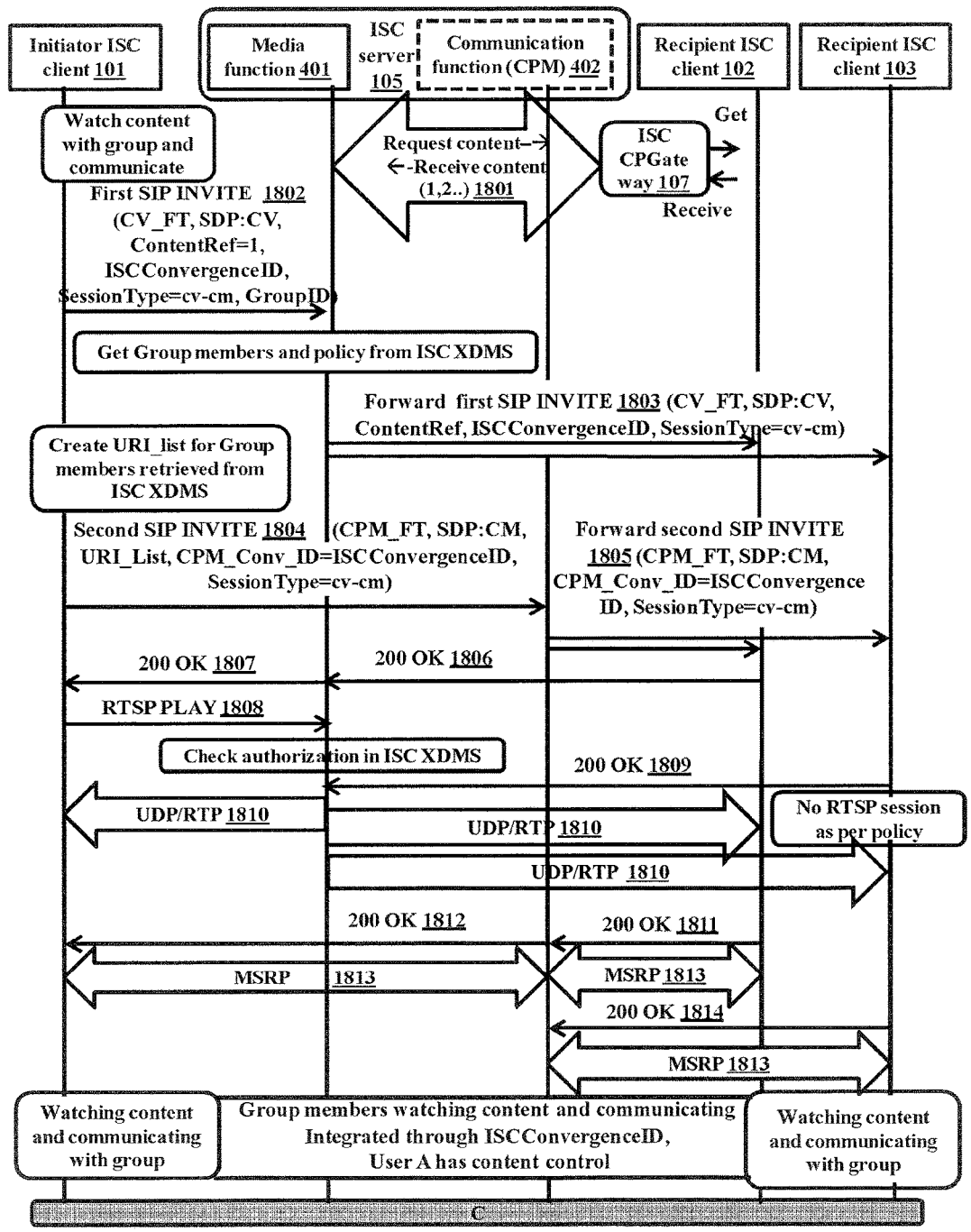
FIG. 18a,b is an example sequence diagram illustrating establishing of the group ISC session for content viewing and communication when contents are available to the ISC clients as unicast and RTSP controls are provided to the user, according to embodiments as disclosed herein.
Figure 18B:
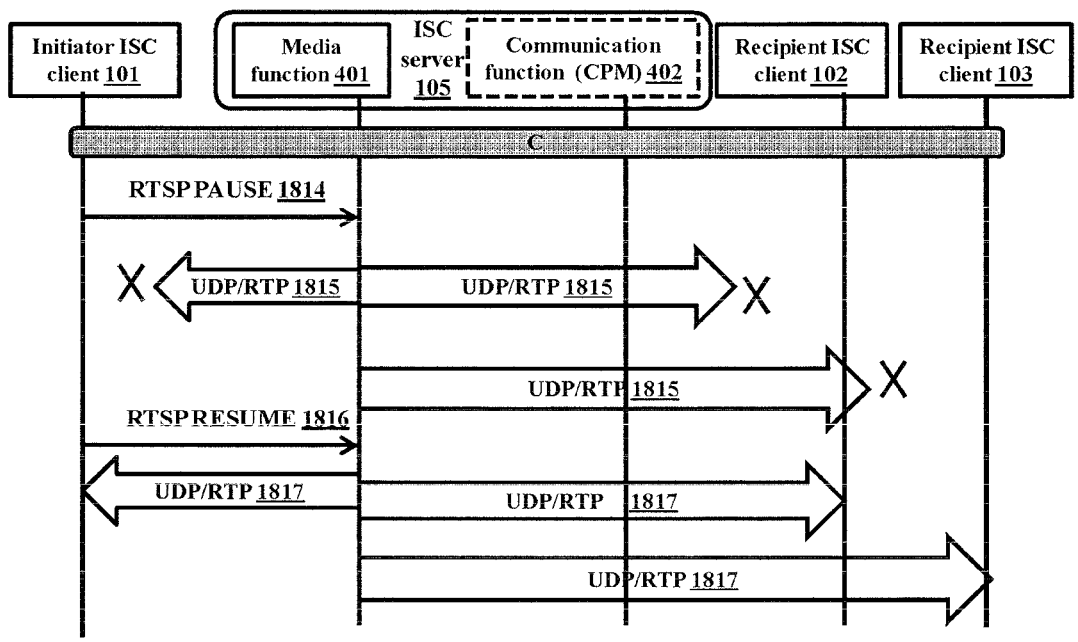

FIG. 18 is the example sequence diagram illustrating establishing of the group ISC session for content viewing and communication when contents are available to the ISC clients as unicast and RTSP controls are provided to the user, according to embodiments as disclosed herein. The FIG. 18 depicts the initiator ISC client 101, the recipient ISC client 102, the recipient ISC client 103, the ISC server 105 including the media function 401 and the communication function 402 and the ISC CPGateway 107 exchanging SIP messages for establishing the content viewing and the communication for the group ISC session.

As described in FIG. 14, the method repeats the same steps to establish the group ISC session for content viewing and the communication except that the manner in which the content are available to the participating ISC clients is unicast with one of the group member allowed the RTSP controls (for example, during the RTSP session for video on demand service). The media function 401 and the participating ISC clients are already aware of the way content is available. Thus the steps described below are performed in similar manner as described in FIG. 14 and are not described in detail to avoid repetition.

The media function 401 receives (1801) the desired contents of the content list from the content provider through the ISC CPGateway 107, the initiator ISC client (101) sends (1802) first SIP INVITE request with mRTSP parameter included in the MIME SDP body (the SDP body contains media descriptions matching the requested media streams in the m-line for setting up the RTSP session according to the rules and procedures of [RFC2326] and [RFC4567]) to the media function 401. The media function 401 accesses the group members and the group policy for the pre-defined group and forwards (1803) the first SIP INVITE to the group members (recipient ISC client 102 and 103 respectively). Further, the initiator ISC client 101 creates URI list and sends (1804) the second SIP INVITE based on the URI list to the communication function 402. Further, the communication function 402 forwards (1805) the second SIP INVITE to the group members (recipient ISC client 102 and 103 respectively).

On reception (1806) and (1809) of 200 OK signal from the one or more recipient ISC client by the media function 401, the media function sends (1807) 200 OK to the initiator ISC client 101. Thereafter, when the initiator ISC client 101 sends RTSP play command, the media function confirms authorization whether the requesting member is allowed for RTSP controls and delivers (1810) the contents requested by the ISC user A of the initiator ISC client 101 in the UDP/RTP tunnel.

On reception (1811 and 1814) 200 OK from at least one of the recipient ISC clients 102 and 103 respectively, the communication function 402 sends (1812) 200 OK to the initiator ISC client 101. Further, the communication function allows communication among the participating group members using the MSRP (1813). Thus, group ISC session, integrated through ISCConvergenceID, for the content viewing and the communication is established for content identified by ContentRef.

Upon request from the ISC user A to pause the content that is being viewed, the initiator ISC client sends (1814) RTSP PAUSE request towards the media function 401. The ISC user is also allowed to perform other RTSP trick play commands such as FORWARD, REWIND, SKIP and the like. Upon receiving the request from the ISC user A to pause the content, the media function stops (1815) delivering the content in the UDP/RTP tunnel to both the initiator ISC client 101 and the recipient ISC client 102.

Upon request from the ISC user A to resume the content that is being paused, the initiator ISC client sends (1816) RTSP RESUME request towards the media function 401. Upon receiving the request from the ISC user A to resume the content, the media function 401 starts (1817) delivering the content to both the initiator ISC client 101 and the recipient ISC client 102 in the UDP/RTP tunnel from the position where it was 'paused' by the ISC user A.

Figure 19:
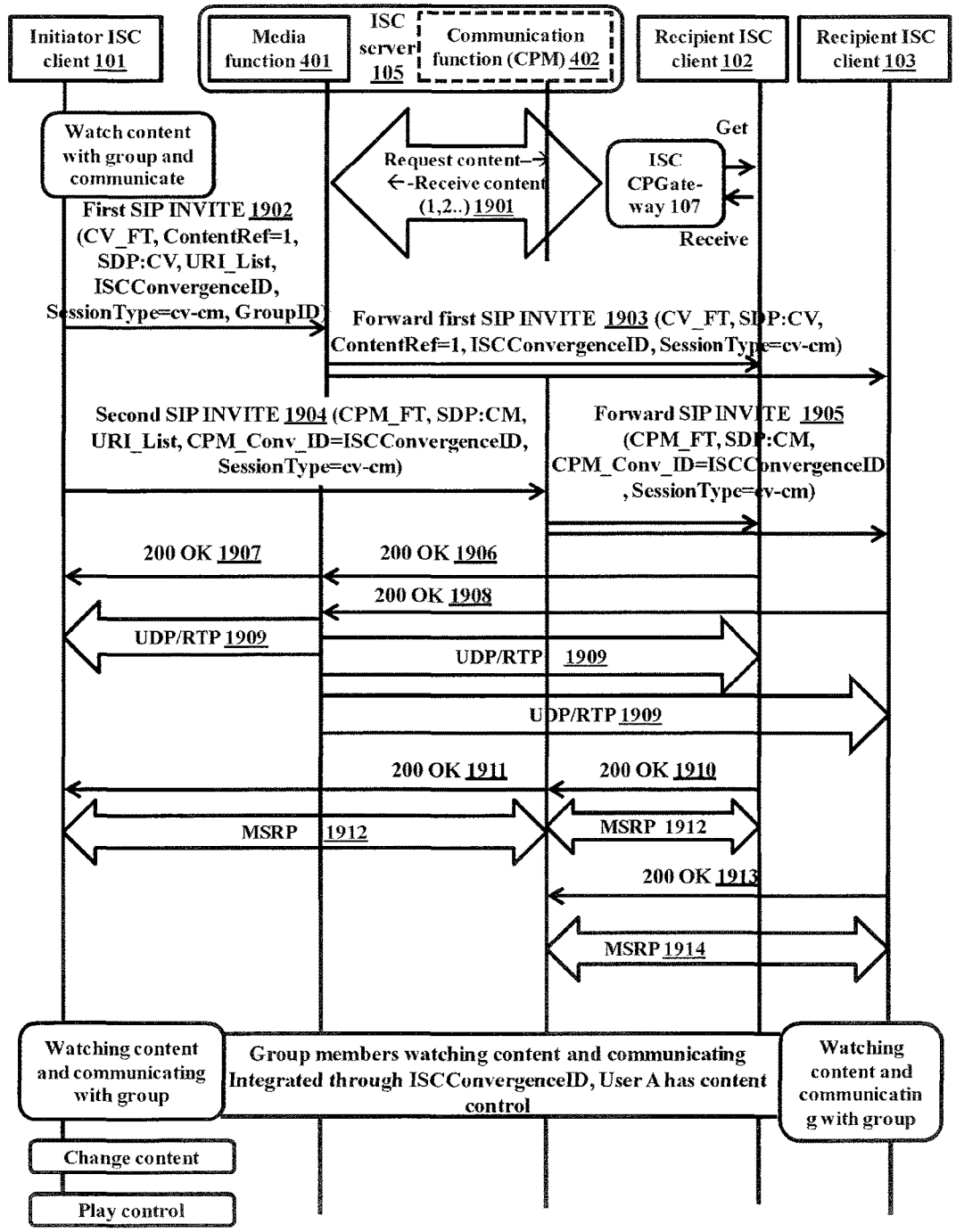
FIG. 19 illustrates an example sequence diagram for forming an ad-hoc ISC group to establish the group ISC session when contents available to the ad-hoc group is unicast, according to embodiments as disclosed herein.

FIG. 19 illustrates the example sequence diagram for forming the ad-hoc ISC group to establish the group ISC session when contents available to the ad-hoc group is unicast, according to embodiments as disclosed herein. The FIG. 19 depicts the initiator ISC client 101, the recipient ISC client 102, the recipient ISC client 103, the ISC server 105 including the media function 401 and the communication function 402 and the ISC CPGateway 107 exchanging SIP messages for establishing the content viewing and the communication for the group ISC session. The sequence of steps for establishing content viewing and the communication between the group members are same as described in FIG. 14, except the ad-hoc group instead of the pre-defined group. The ad-hoc group dynamically formed by the ISC user A of the initiator ISC client 101 does not have the pre-defined GroupID. Thus, the initiator ISC client 101 sends the URI list to inform the ISC server 105 about the group members. Hence, the media function 401 is not required to retrieve the group members and check the group policy from the ISC XDMS 106.

Except for the above changes the sequence of steps is similar to the steps described in FIG. 14 as is not described in details to avid repetition.

The media function 401 receives (1901) the desired contents of the content list from the content provider through the ISCCPGateway 107. The initiator ISC client 101 sends (1902) first SIP INVITE to the media function 401 that includes the URI list of the group members of the ad-hoc group. The media function 401 forwards (1903) the first SIP INVITE to the group members (recipient ISC client 102 and 103 respectively) based on the received URI list. Further, the initiator ISC client 101 uses the existing URI list used during generation of the first SIP INVITE and then sends (1904) the second SIP INVITE to the communication function 402. Further, the communication function 402 forwards (1905) the second SIP INVITE to the group members (recipient ISC client 102 and 103 respectively) based on the received URI list.

On reception (1906 and 1908) of 200 OK signal from the one or more recipient ISC client by the media function 401, the media function 401 sends (1907) 200 OK to the initiator ISC client 101. Thereafter, the media function 401 delivers (1909) the contents requested by the ISC user A of the initiator ISC client 101 in the UDP/RTP tunnel.

On reception (1910 and 1913) 200 OK from at least one of the recipient ISC clients 102 and 103 respectively, the communication function 402 sends (1911) 200 OK to the initiator ISC client 101. Further, the communication function 402 allows communication among the participating group members using the MSRP (1912). Thus, group ISC session with the ad-hoc group, integrated through ISCConvergenceID, for the content viewing and the communication is established. The initiator ISC client 101 can further change content and play controls as desired, as there is no group policy stored in the ISC XDMS for the ISC ad-hoc group.

Figure 20:
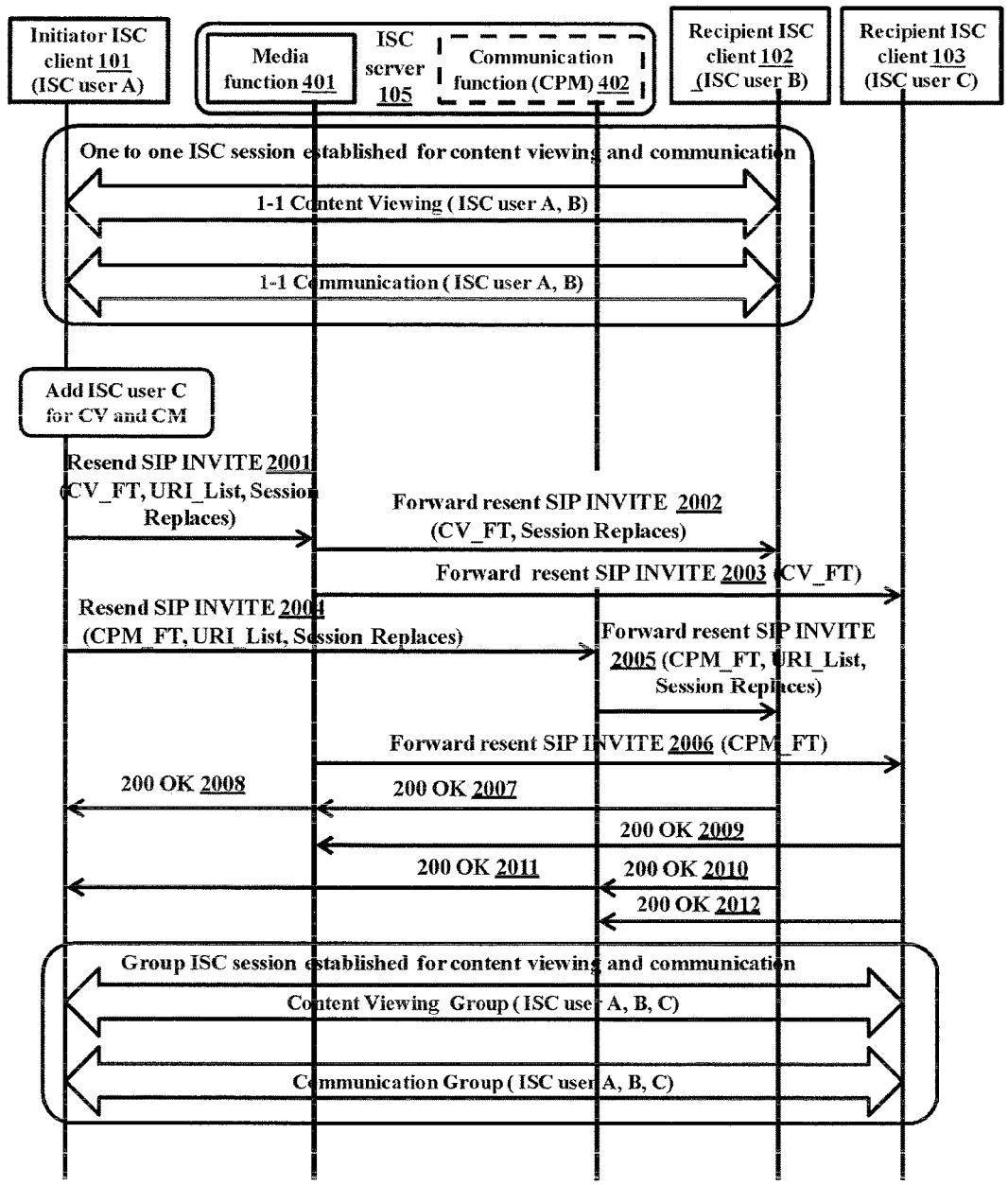
FIG. 20 illustrates an example sequence diagram for extending an established one to one ISC session to the group ISC session, according to embodiments as disclosed herein.

FIG. 20 illustrates the example sequence diagram for extending the established one to one ISC session to the group ISC session, according to embodiments as disclosed herein. The FIG. 20 depicts the initiator ISC client 101, the recipient ISC client 102, the recipient ISC client 103 and the ISC server 105 including the media function 401 and the communication function 402 exchanging SIP messages for the content viewing and the communication for the group ISC session. Further, the FIG. 20 depicts the 1-1 ISC session for content viewing and communication between ISC users A and B after performing steps described in FIG. 9 and FIG. 10. If ISC user A desires to add new ISC user C (the recipient ISC client 103) to the ongoing 1-1 session, then upon such a request the initiator ISC client generates a SIP INVITE request for resending the SIP INVITE as specified in RFC 3261 with the following clarifications as provided by the method disclosed:

1. Include Request-URI to the URI of the ISC Server provisioned in the client.
2. Include the ISC feature tag CV_FT which is for initiating Group content viewing and communication CV_FT with ICSI value (+g.3gpp.icsi-ref="urn%3Aurn- 7%3A3gpp-service.ims.icsi.omalsc.cv-cm) is included in Accept-Contact header field, Contact header field and P-Preferred-Service header field. And CV_FT with IARI value (+g.3gpp.icsi-ref="urn%3Aurn-7%3A3gpp-service.imslari.omalsc.group-cv-cm) is included in Accept-Contact header field.

3. Include address of the recipient ISC client 102 and 103 respectively. The URI-List includes the URI-List in the body where the address of recipient ISC client additionally includes 'Session-Replaces' with the ongoing 1-1 session identity.

Include the ContentRef and may be additional content information corresponding to the current content the established ISC group is watching.

4. Include globally unique identifier (new value is generated if it is for initiating new content viewing session otherwise from existing content viewing session) for determining the Content Viewing associated to ISC Convergence in the ISCConvergence-ID.

5. Include the SDP for Unicast content viewing and below headers in the body.

6. Include the ContentRef corresponding to the content the ISC user A has selected to watch. The value of this field is obtained from the contents list. For example the value of ContentRef is included in the MIME SDP body of the SIP INVITE under new Content-Type header field "application/ISC-content-request+xml".

Further, the initiator ISC client 101 resends (2001) the SIP INVITE request for extending the one to one ISC session to the group ISC session towards the media function 401. Upon receiving the SIP INVITE request from the Client A with the URI list containing Session-Replaces header for Client B, the media function 401 generates SIP INVITE request towards Client B including the information to replace the ongoing 1-1 Session Identity.

Upon receiving the resent SIP INVITE request from the Client A with the URI List containing address of the recipient ISC client 103 to be included for content viewing, the media function 401 generates and forwards (2002) another SIP INVITE request towards recipient ISC client 103. The initiator ISC client resends (2004) the SIP INVITE for communication to the communication function 402 with similar parameters as in the resent SIP invite, for content viewing, except the feature tag indicates CPM_FT for the communication.

After receiving (2007, 2009, 2010 and 2012) successful response 200 OK for the SIP INVITE requests and ISC server 105 sends 200 OK (2008 and 2011) to the initiator ISC client 101. Thus, the 1-1 content viewing and communication session between ISC user A and B respectively is now dynamically extended to group ISC session with the new ad-hoc group for the content viewing and communication among ISC users A, B and C respectively.

Figure 21:
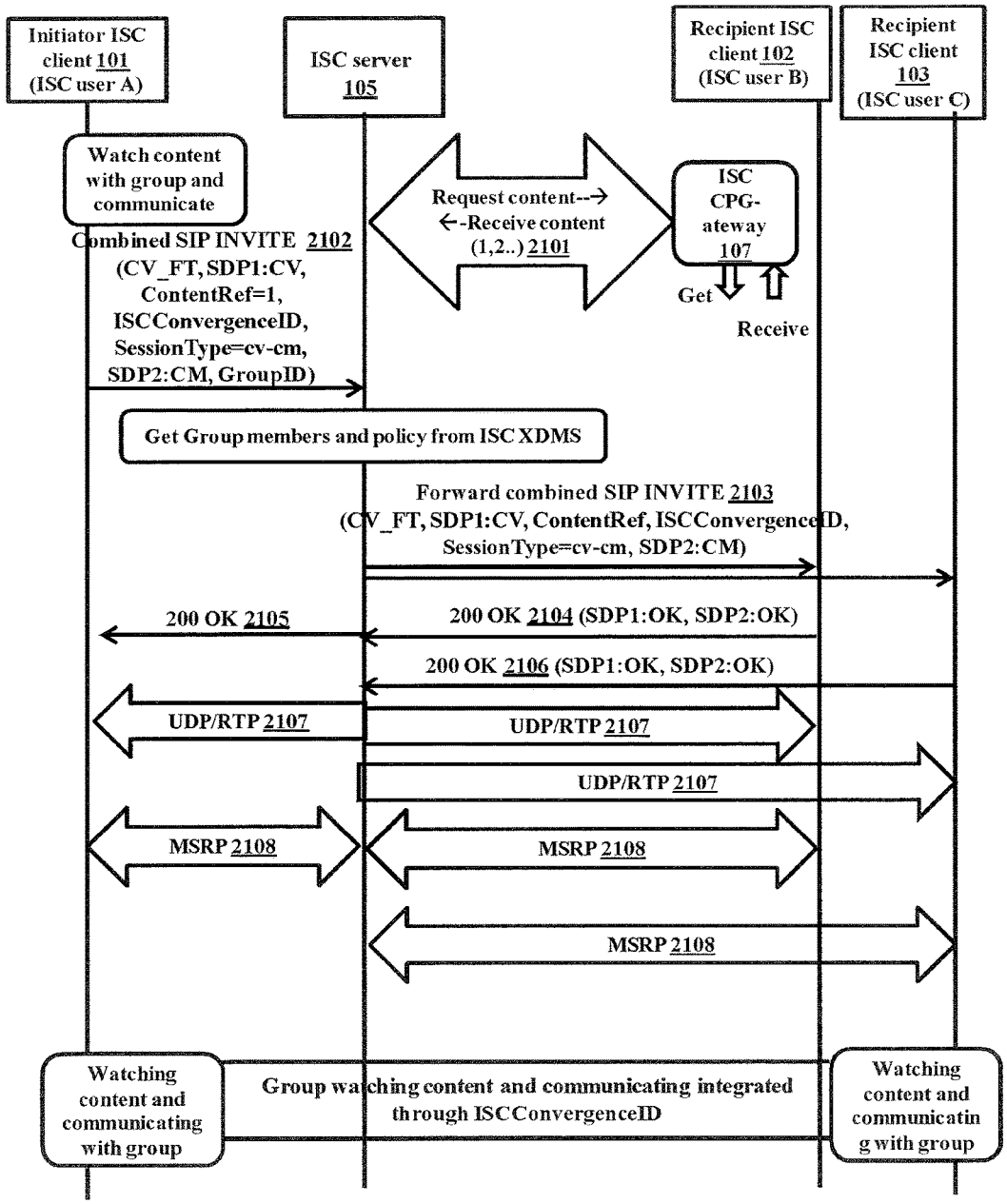
FIG. 21 illustrates an example sequence diagram for establishing group ISC session for content viewing and communication when the media function and the communication function are integrated in the ISC server, according to embodiments as disclosed herein.

FIG. 21 illustrates the example sequence diagram for establishing group ISC session for content viewing and communication when the media function and the communication function are integrated in the ISC server, according to embodiments as disclosed herein. The FIG. 21 depicts the initiator ISC client 101, the recipient ISC client 102, the recipient ISC client 103, the ISC server 105 with integrated media function and communication function and the ISC-CPGateway 107 exchanging SIP messages for the content viewing and the communication for the group ISC session.

The media function 401 receives (2101) the content from the content provider through the ISC CPGateway 107. The sequence steps for establishing the group ISC session for content viewing and communication are similar to the steps as described in FIG. 13 with respect to one to one ISC session, except that the combined SIP INVITE sent (2102) to the ISC server 105 includes the ISC GroupID to inform the ISC server 105 forward the combined SIP INVITE to all the group members (recipients ISC clients within the group specified by ISC GroupID). Further, the ISC server 105 retrieves the group members and the group policy from the ISC XDMS 106 and forwards (2103) the combined SIP INVITE to all invited the group members (recipient ISC client 102 and 103 respectively).

The invited group members respond (2104 and 2106) with 200 OK that includes SDP1: OK, SDP2: OK (combined SIP INVITE accept message) in response to the combined SIP INVITE, if there are no errors to the request. The 200 OK received indicates that the group members accept both the content viewing and the communication invites with initiator ISC client 101. If error is identified, then the ISC server 105 responds with error as specified in IETF RFC 3261. The ISC server 105 forwards (2105) the 200 OK to the initiator ISC client 101 on reception of the 200 OK from either of the recipient ISC client.

The ISC server 105 starts (2107) delivering the content corresponding to ContentRef in the UDP/RTP tunnel and allows communication among the group members. Now the group members watch the same content and communicate with each other integrated through ISCConvergenceID.

Figure 22:
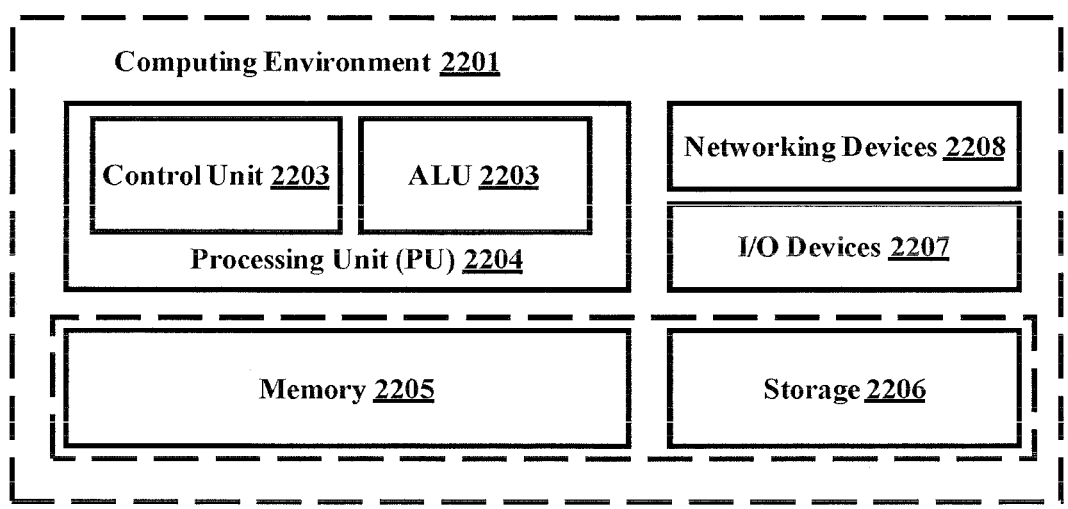
FIG. 22 illustrates a computing environment implementing a method and system for establishing the ISC session for integrating content viewing and communication, according to embodiments as disclosed herein.

FIG. 22 illustrates the computing environment implementing the method and system for establishing the ISC session for integrating content viewing and communication, according to embodiments as disclosed herein. As depicted the computing environment 2201 comprises at least one processing unit 2204 that is equipped with a control unit 2202 and an Arithmetic Logic Unit (ALU) 2203, a memory 2205, a storage unit 2206, plurality of networking devices 2208 and a plurality of input output (I/O) devices 2207. The processing unit 2204 is responsible for processing the instructions of the algorithm. The processing unit 2204 receives commands from the control unit in order to perform its processing. Further, any logical and arithmetic operations involved in the execution of the instructions are computed with the help of the ALU 2203.

The overall computing environment 2201 can be composed of multiple homogeneous and/or heterogeneous cores, multiple CPUs of different kinds, special media and other accelerators. The processing unit 2204 is responsible for processing the instructions of the algorithm. Further, the plurality of processing units 2204 may be located on a single chip or over multiple chips.

The algorithm comprising of instructions and codes required for the implementation are stored in either the memory unit 2205 or the storage 2206 or both. At the time of execution, the instructions may be fetched from the corresponding memory 2205 and/or storage 2206, and executed by the processing unit 2204.

In case of any hardware implementations various networking devices 2208 or external I/O devices 2207 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 3, 4, 6, through 22 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for establishing an immersive social center (ISC) session by an ISC server, the method comprising:
   receiving, by the ISC server, a first session initiation protocol (SIP) invite request including at least one first parameter from an originating ISC client by a media function in the ISC server for initiating the ISC session providing a content viewing, the at least one first parameter comprising a header field and at least one element in a multipurpose internet mail extensions (MIME) body;
   establishing, by the ISC server, the ISC session providing the content viewing by the media function based on one or more parameters appended to the first SIP invite request;
   receiving, by the ISC server, a second SIP invite request comprising at least one second parameter from the originating ISC client by a communication function in the ISC server to initiate the ISC session providing communication, the at least one second parameter comprising the header field and the at least one element in the MIME body; and
   establishing the ISC session to provide communication by the communication function based on one or more parameters appended to the second SIP invite request,
   wherein a SIP is used as a protocol used to initiate and manage the ISC session.

2. The method of claim 1,
   wherein the header field in the first SIP invite request is an ISC convergence ID indicating a globally unique identifier for SIP messages associated request and response for the ISC session for at least one of the content viewing or the communication, and
   wherein SIP messages associated requests and responses for the ISC session for same content viewing and same communication include the same value for the ISC convergence ID.

3. The method of claim 2,
   wherein headers in the header field in the first SIP invite request comprise at least one of an Accept-Contact header, a Contact header or a P-Preferred-Service header,
   wherein the headers further comprise an IP multimedia subsystem (IMS) communication service identifier (ICSI) and an IMS application reference identifier (IARI) feature tag,
   wherein the ICSI feature tag indicates whether the initiated ISC session is for invoking one of the media function for the content viewing or the communication function for the communication, and
   wherein the IARI feature tag indicates to a terminating ISC client among plurality of terminating ISC clients whether the initiated ISC session is one of a self ISC session, a one to one ISC session, or a group ISC session.

4. The method of claim 3,
   wherein, the at least one element in the MIME body comprises an ISC session type and a synchronization,
   wherein, the ISC session type indicates to the terminating ISC client whether the initiated ISC session is for at least one of the content viewing or the communication,
   wherein the synchronization indicates to the media function whether the originating ISC client and the terminating ISC client in the one to one ISC session are synchronized for the content viewing, and
   wherein the ISC session type is used by the terminating ISC client to indicate that the terminating ISC client is required to wait for the second SIP invite request after receiving the first SIP invite request.

5. The method of claim 1,
   wherein the at least one second parameter comprises a communication session identifier assigned with a value of an ISC convergence ID, and
   wherein the communication session identifier is a converge IP messaging (CPM) conversation ID identifying the communication.

6. A method for initiating an immersive social center (ISC) session by an originating ISC client, the method comprising:
   receiving, by the ISC client, a request to initiate the ISC session to provide at least one of content viewing or communication;
   generating, by the ISC client, and transmitting a first session initiation protocol (SIP) invite request including at least one first parameter appended to the first SIP invite to a media function in an ISC server to initiate the ISC session to provide the content viewing, the at least one first parameter comprising a header field and at least one element in a multipurpose internet mail extensions (MIME) body;
   generating, by the ISC client, and transmitting a second SIP invite request comprising at least one second parameter appended to the second SIP invite to a communication function in the ISC server to initiate the ISC session to provide the communication, the at least one second parameter comprising the header field and the at least one element in the MIME body;
   participating, by the ISC client, in the ISC session by providing content viewing after the media function establishes the ISC session; and
   participating, by the ISC client, in the ISC session by providing communication after the communication function establishes the ISC session,
   wherein a SIP is used as a protocol used to initiate and manage the ISC session.

7. The method of claim 6,
   wherein the header field in the first SIP invite request is an ISC convergence ID indicating a globally unique identifier for SIP messages associated request and response for the ISC session for at least one of the content viewing or the communication, and
   wherein SIP messages associated requests and responses for the ISC session for same content viewing and same communication include the same value for the ISC convergence ID.

8. The method of claim 7,
wherein headers in the header field in the first SIP invite request comprise at least one of an Accept-Contact header, a Contact header or a P-Preferred-Service header,
wherein the headers further comprise an IP multimedia subsystem (IMS) communication service identifier (ICSI) and an IMS application reference identifier (IARI) feature tag included,
wherein the ICSI feature tag indicates whether the initiated ISC session is for invoking one of the media function for the content viewing or the communication function for the communication the content viewing and the communication, and
wherein the IARI feature tag indicates to a terminating ISC client among plurality of terminating ISC clients whether the initiated ISC session is one of a self ISC session, a one to one ISC session, or a group ISC session.

9. The method of claim 8,
wherein the at least one element in the MIME body comprises an ISC session type and a synchronization,
wherein the ISC session type indicates to the terminating ISC client whether the initiated ISC session is for at least one of the content viewing or the communication,
wherein the synchronization indicates to the media function whether the originating ISC client and a terminating ISC client in the one to one ISC session are synchronized for the content viewing, and
wherein the ISC session type is used by the terminating ISC client to indicate that the terminating ISC client is required to wait for the second SIP invite request after receiving the first SIP invite request.

10. The method of claim 6,
wherein the at least one second parameter comprises a communication session identifier assigned with a value of an ISC convergence ID, and
wherein the communication session identifier comprises a converge IP messaging (CPM) conversation ID identifying the communication.

11. A method for participating in an immersive social center (ISC) session by a terminating ISC client, the method comprising:
receiving, by the terminating ISC client, at least one of a first session initiation protocol (SIP) invite request from a media function of an ISC server or a second SIP invite request from a communication function of the ISC server definine participation in an ISC session initiated by an originating ISC client;
determining, by the terminating ISC client, whether the ISC session is to provide at least one of a content viewing and communication based on a value of an ISC session type in at least one of the first SIP invite request or the second SIP invite request; and
sending, by the terminating ISC client, response to the media function or the communication function indicating participation in the ISC session based on input from the terminating ISC client,
wherein a SIP is used as a protocol to initiate and manage the ISC session.

12. The method of claim 11,
wherein the first SIP invite request comprises a header field including an ISC convergence ID and an ISC feature tag,
wherein the ISC convergence ID comprises a globally unique identifier for SIP messages associated request and response for the ISC session for at least one of the content viewing or the communication, and
wherein SIP messages associated requests and responses for the ISC session for same content viewing and same communication include the same value for the ISC convergence ID.

13. The method of claim 11,
wherein the first SIP invite request further comprises at least one element in a MIME body, and
wherein the ISC session type indicates whether the ISC session is for at least one of the content viewing, or the communication.

14. The method of claim 11,
wherein the second SIP invite request comprises a communication session identifier assigned with a value of an ISC convergence ID, and
wherein the communication session identifier comprises a converge IP messaging (CPM) conversation ID identifying the communication.

15. An apparatus for establishing an immersive social center (ISC) session, the apparatus comprising:
a memory configured to store instructions; and
at least one processor coupled to the memory and upon execution of the stored instructions is configured to:
receive a first session initiation protocol (SIP) invite request including at least one first parameter from an originating ISC client to initiate the ISC session to provide a content viewing, the at least one first parameter comprising a header field and at least one element in a multipurpose internet mail extensions (MIME) body, and
establish the ISC session to provide the content viewing based on one or more parameters appended to the first SIP invite request; and
a communication circuit configured to:
receive a second SIP invite request comprising at least one second parameter from the originating ISC client to initiate the ISC session to provide communication, the at least one second parameter comprising the header field and the at least one element in the MIME body, and
establish the ISC session to provide communication based on one or more parameters appended to the second SIP invite request,
wherein a SIP is used as a protocol to initiate and manage the ISC session.

16. The apparatus of claim 15,
wherein the header field in the first SIP invite request comprises an ISC convergence ID indicating a globally unique identifier for SIP messages associated request and response for the ISC session for at least one of the content viewing or the communication,
wherein, the at least one element in the MIME body comprises an ISC session type and a synchronization,
wherein the ISC session type indicates a terminating ISC client whether the initiated ISC session is for at least one of the content viewing or the communication, and
wherein the synchronization indicates a media function the originating ISC client and the terminating ISC client in the one to one ISC session are synchronized for the content viewing.

17. An apparatus for initiating an immersive social center (ISC) session, the apparatus comprising:
a memory configured to store instructions; and
at least one processor coupled to the memory and upon execution of the stored instructions is configured to:

receive a request to initiate the ISC session providing at least one of content viewing or communication, generate and transmit a first session initiation protocol (SIP) invite request including at least one first parameter appended to the first SIP invite to a media function in an ISC server to initiate the ISC session providing the content viewing, the at least one first parameter comprising a header field and at least one element in a multipurpose internet mail extensions (MIME) body, generate and transmit a second SIP invite request comprising at least one second parameter appended to the second SIP invite to a communication function in the ISC server to initiate the ISC session to provide the communication, the at least one second parameter comprising the header field and the at least one element in the MIME body, participate in the ISC session by providing content viewing after the media function establishes the ISC session, and participate in the ISC session by providing communication after the communication function establishes the ISC session, wherein a SIP is used as a protocol to initiate and manage the ISC session.

18. The apparatus of claim 17, wherein the header field in the first SIP invite request comprises an ISC convergence ID indicating a globally unique identifier for SIP messages associated request and response for the ISC session for at least one of the content viewing or the communication, wherein, the at least one element in the MIME body comprises an ISC session type and a synchronization, wherein the ISC session type indicates a terminating ISC client whether the initiated ISC session is for at least one of the content viewing or the communication, and wherein the synchronization indicates to the media function whether an originating ISC client and the terminating ISC client in the one to one ISC session are synchronized for the content viewing.

19. An apparatus for participating in an immersive social center (ISC) session, the apparatus comprising:

a memory configured to store instructions; and at least one processor coupled to the memory and upon execution of the stored instructions is configured to:

receive at least one of a first session initiation protocol (SIP) invite request from a media function of an ISC server or a second SIP invite request from a communication function of the ISC server to participate in an ISC session initiated by an originating ISC client, determine whether the ISC session is to provide at least one of a content viewing or communication based on a value of an ISC session type in at least one of the first SIP invite request or the second SIP invite request, and transmit a response to the media function or the communication function indicating participation in the ISC session based on input from the terminating ISC client, wherein a SIP is used as a protocol to initiate and manage the ISC session.

20. The apparatus of claim 19, wherein the first SIP invite request comprises a header field including an ISC convergence ID and an ISC feature tag, wherein the ISC convergence ID comprises a globally unique identifier for SIP messages associated request and response for the ISC session for at least one of the content viewing or the communication, wherein the first SIP invite request further comprises at least one element in a MIME body, and wherein the ISC session type indicates whether the ISC session is for at least one of the content viewing or the communication.

\* \* \* \* \*